United States Patent [19]
Kasica et al.

[11] Patent Number: 5,188,674
[45] Date of Patent: Feb. 23, 1993

[54] CONTINUOUS COUPLED JET-COOKING/SPRAY-DRYING PROCESS AND NOVEL PREGELATINIZED HIGH AMYLOSE STARCHES PREPARED THEREBY

[75] Inventors: James J. Kasica, Somerville; James L. Eden, East Millstone, both of N.J.

[73] Assignee: National Starch and Chemical Investment Holding Corporation, Wilmington, Del.

[21] Appl. No.: 697,659

[22] Filed: May 8, 1991

Related U.S. Application Data

[62] Division of Ser. No. 242,657, Sep. 12, 1988.

[51] Int. Cl.$^5$ .............. C08B 30/00; C08F 16/06; C08F 8/00; C08G 68/91
[52] U.S. Cl. .................................. 127/65; 127/67; 127/69; 525/56; 525/62
[58] Field of Search ............... 127/65, 67, 69; 525/56, 525/62

[56] References Cited

U.S. PATENT DOCUMENTS

| | | | |
|---|---|---|---|
| H561 | 12/1988 | Brown et al. | 426/568 |
| 1,516,512 | 11/1924 | Stutzke. | |
| 1,901,109 | 3/1933 | Maier. | |
| 2,314,459 | 3/1943 | Salzburg | 99/139 |
| 2,582,198 | 1/1952 | Etheridge | 127/28 |
| 2,805,966 | 9/1957 | Etheridge | 127/32 |
| 2,919,214 | 12/1959 | Etheridge | 127/28 |
| 2,940,876 | 6/1960 | Elsas | 127/28 |
| 3,086,890 | 4/1963 | Sarko et al. | 127/69 |
| 3,133,836 | 5/1964 | Winfrey et al. | 127/71 |
| 3,137,592 | 6/1964 | Protzman et al. | 127/32 |
| 3,234,046 | 2/1966 | Etheridge | 127/28 |
| 3,332,785 | 7/1967 | Jycgubie et al. | 99/139 |
| 3,391,003 | 7/1968 | Armstrong et al. | 127/32 |
| 3,424,613 | 1/1969 | Huber et al. | 127/32 |
| 3,515,591 | 6/1970 | Feldman et al. | 127/69 |
| 3,553,196 | 1/1971 | Mark et al. | 127/32 |
| 3,607,394 | 9/1971 | Germino et al. | 127/69 |
| 3,630,775 | 12/1971 | Winker | 127/71 |
| 3,637,656 | 1/1972 | Germino et al. | 260/233.3 |
| 3,928,055 | 12/1975 | Brailsford et al. | 106/214 |
| 4,256,771 | 3/1981 | Henderson et al. | 127/32 |
| 4,280,851 | 7/1981 | Pitchon et al. | 127/33 |
| 4,579,944 | 4/1986 | Harvey et al. | 536/102 |
| 4,721,655 | 1/1988 | Trzasko et al. | 162/178 |
| 4,871,398 | 10/1989 | Katcher et al. | 127/69 |

*Primary Examiner*—Theodore Morris
*Assistant Examiner*—P. L. Hailey
*Attorney, Agent, or Firm*—Margaret B. Kelley; Edwin M. Szala

[57] ABSTRACT

A continuous coupled jet-cooking/spray-drying process for processing inherently water-dispersible or water-soluble crystalline polymers, such as starches, polygalactomannan gums, and fully hydrolyzed polyvinyl alcohols, is disclosed. It involves the steps of: (a) forming a slurry or paste of the polymer and water, (b) jet-cooking the slurry or paste with steam at a temperature sufficient to fully disperse or solubilize the polymer, (c) immediately conveying and introducing under elevated temperature and pressure the jet-cooked dispersion or solution into a nozzle of a spray-dryer chamber, (d) atomizing the jet-cooked dispersion or solution through the nozzle, (e) drying the atomized mist within the spray-dryer chamber at a temperature sufficient to dry the polymer; and (f) recovering the dried polymer as a water-dispersible or water-soluble powder.

High amylose starches (above about 40% amylose) prepared by this process are characterized in that the starch is substantially non-crystalline and substantially non-degraded. Starch mixtures, mixtures of high amylose starches and other starches, gums, or polyvinyl alcohols can be co-processed.

32 Claims, 9 Drawing Sheets

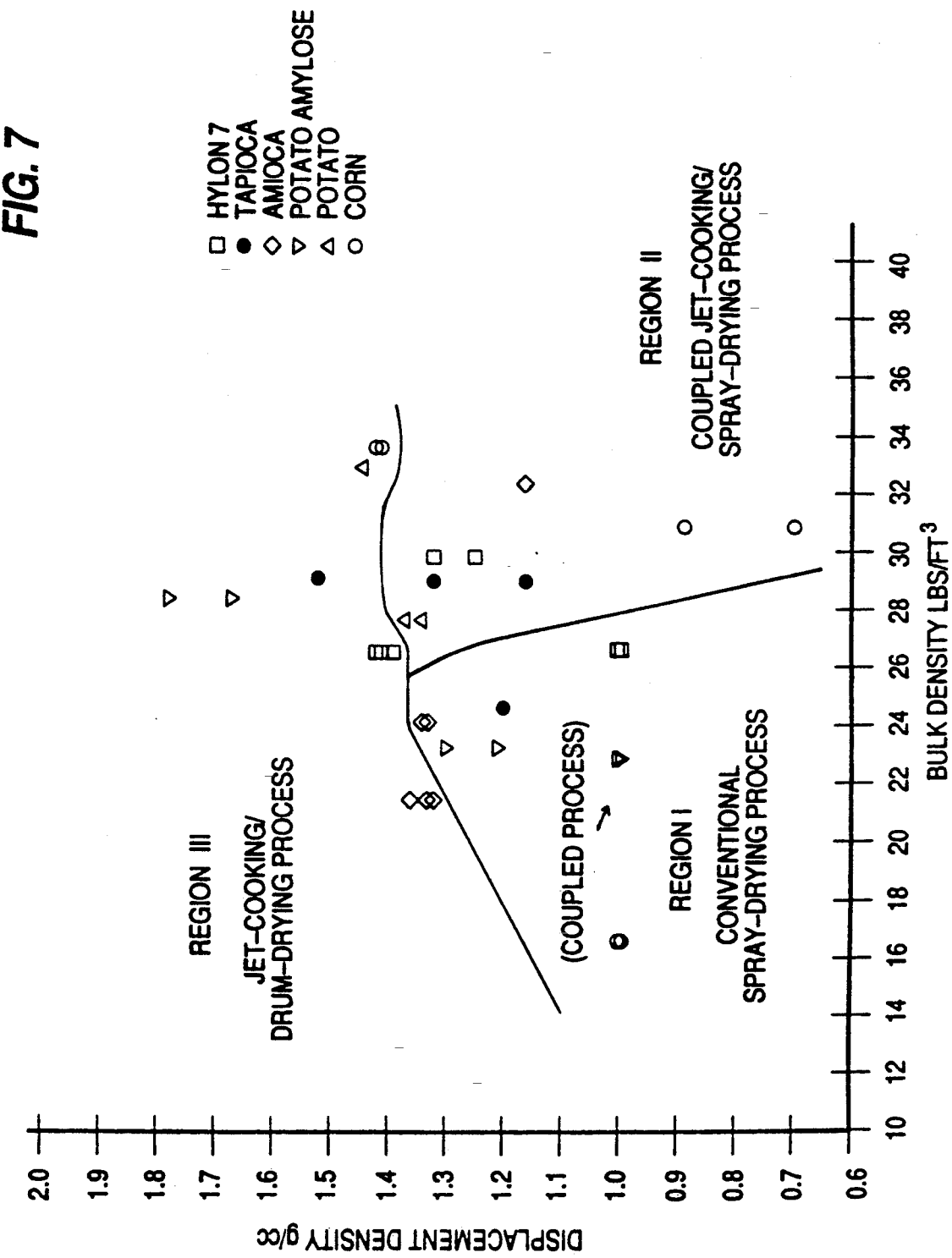

CONTINUOUS COUPLED JET-COOKING/SPRAY-DRYING PROCESS AND NOVEL PREGELATINIZED HIGH AMYLOSE STARCHES PREPARED THEREBY

BACKGROUND OF THE INVENTION

This invention relates to a process for jet-cooking and spray-drying water-dispersible or water-soluble polymers, especially high viscosity starches such as high amylose starches. It also relates to the unique pregelatinized high amylose starches produced thereby.

Pregelatinized starches (i.e., cold-water-dispersible starches) are typically prepared by thermal, chemical, or mechanical gelatinization. The term "gelatinized" or "cooked" starch refers to swollen starch granules which have lost their polarization crosses and which may or may not have lost their granular structure.

The thermal processes generally used to prepare such starches include batch cooking, autoclaving, and continuous cooking processes in a heat exchanger or jet-cooker. The thermal dispersion of a granular starch in water involves a complex mechanism. See the discussion at pp. 427–444 in Chapter 12, by Kruger & Murray of *Rheology & Texture in Food Quality*, Edited by T. M. DeMan, P. W. Voisey, V. F. Rasper, and D. W. Stanley (AVI Publishing, Westport, Conn. 1976), at pp. 449–520 in Chapter 21 of *Starch: Chemistry & Technology*, Vol. 2, edited by R. L. Whistler (Academic Press, New York, N.Y. 1967) and at pp. 165–171 in Chapter 4 by E. M. Osman of *Food Theory and Applications*, edited by P. C. Paul and H. H. Palmer (John Wiley & Sons, Inc., New York, N.Y. 1972). The process begins at the gelatinization temperature, as water is absorbed into the starch granules, and continues as the hydrated granules swell and disrupt into smaller granule fragments until the starch finally approaches a molecular dispersion. The viscosity of the cook changes significantly during this process, increasing as the granules hydrate and swell and decreasing as the granular fragments are reduced in size. An appropriate amount of shear aids in breaking down the swollen granular fragments to give a molecular dispersion without substantial molecular degradation.

Pregelatinized starches are typically prepared by spray-drying, drum-drying, or extrusion.

Drum-drying involves simultaneously cooking and drying a starch slurry or paste on heated, rotating drums. Cooking and drying are accomplished over a period of time as determined by the temperature and rotation rate of the drums. The dried sheets are scraped off the drum with a metal knife and then ground. This process can be conveniently carried out at high solids content (typically about 43% maximum). The disadvantage of drum-drying is that this method generally only partially disperses the starch (i.e., the starch is not completely gelatinized) and this can result in poorly dispersible powders having undesirable textures when redispersed.

Extrusion may also be used to simultaneously cook and dry starches (see U.S. Pat. No. 3,137,592 issued Jun. 16, 1964 to T. F. Protzman et al.). This method involves the physical working of a starch-water mixture at elevated temperature and pressure, causing the gelatinization of the starch, followed by expansion during flashing off the water after exiting from the extruder. The temperature and pressure are generated by mechanical shear between the rotating screw (auger) and cylindrical housing (barrel) of the extruder. Cooking is accomplished with both thermal and mechanical energy as the starch is forced through the system. This typically results in high viscosity during processing due to incomplete cooking and the final products are typically degraded due to molecular breakdown caused by excessive shear. Upon redispersion, the powders can give undesirable grainy textures, especially when low moisture starches are processed, due to incomplete dispersion during cooking. When starch is processed in the presence of additional water, a further drying step is required after the extrudate exits the extruder. This extended drying time further exaggerates the undesirable textures upon redispersion.

The following patents describe various processes for preparing pregelatinized starches.

U.S. Pat. No. 1,516,512 (issued Nov. 25, 1924 to R. W. G. Stutzke) describes a process for modifying starch in which starch slurries are forced through a heated pipe coil and then through a spraying orifice into a drying chamber. The slurries are processed with or without acid. The slurries are forced through the coil at excessively high pressure (e.g., 1000 lbs.) in order to insure against the possibility of vaporizing the liquid under treatment. Steam is maintained at 35–110 pounds of pressure. The temperature of the air introduced into the drying chamber is about 121° C. (250° F.), which is reduced to about 96° C. (204° F.) at the point of evaporation. The resulting starches are hydrolyzed and are about 15–75% soluble in cold water.

U.S. Pat. No. 1,901,109 (issued Mar. 14, 1933 to W. Maier) describes a spray-drying process in which starch slurries are atomized into a stream of heated air containing water vapor in such amount that vaporization of the water from the atomized particles occurs at a temperature above the gelatinization temperature of the starch and below the temperature at which further alteration (e.g., hydrolysis) occurs. The process can be carried out with or without a chemical gelatinization agent.

U.S. Pat. No. 3,630,775 (issued Dec. 28, 1971 to A. A. Winkler) describes a spray-drying process in which a starch slurry is maintained under pressure during heating and continued under pressure through the atomization step. The pressure is interdependent with viscosity, temperature, and apparatus. The pressure requirement is that necessary for atomization and is in excess of that necessary to prevent vaporization of water in a slurry of high solids at elevated temperatures. The heating time is that which is sufficient to allow substantially complete gelatinization and solubilization of the starch if previously ungelatinized. Typically, the slurries (10–40% solids) are preheated to 54°–171° C. (130°–340° F.), pumped under 2,000–6,800 psi of pressure through a continuous tubular heat exchanger, and heated to 182°–304° C. (360°–580° F.) (which result in starch temperatures of 163°–232° C.–325°–450° F.). Retention time of the starch in the cooker is 1.0–2.5 minutes. A conventional spray-dryer with a pressure type atomizing nozzle is used. The resulting starches are characterized as having less than 12% moisture, greater than 33 lb/ft$^3$ bulk density, and greater than 50% cold-water solubility.

U.S. Pat. No. 4,280,851 (issued Jul. 28, 1981 to E. Pitchon et al.) describes a spray-drying process for preparing granular pregelatinized starches. In this process a mixture of the granular starch in an aqueous solvent is cooked or gelatinized in an atomized state.

The starch which is to be cooked is injected through an atomization aperture in a nozzle assembly to form a relatively finely-divided spray. A heating medium is also injected through an aperture in the nozzle assembly into the spray of atomized material so as to heat the starch to the temperature necessary to gelatinize the starch. An enclosed chamber surrounds the atomization and heating medium injection apertures and defines a vent aperture positioned to enable the heated spray of starch to exit the chamber. The arrangement is such that the lapsed time between passage of the spray of starch through the chamber, i.e., from the atomization aperture and through the vent aperture, defines the gelatinization time of the starch. The resulting spray-dried, pregelatinized starch comprises uniformly gelatinized starch granules in the form of indented spheres, with a majority of the granules being whole and unbroken and swelling upon rehydration. Nozzles suitable for use in the preparation of these starches are also described in U.S. Pat. No. 4,610,760 (issued Sep. 9, 1986 to P. A. Kirkpatrick et al.).

U.S. Pat. No. 3,086,890 (issued Apr. 23, 1963 to A. Sarko et al.) describes a process for preparing a pregelatinized isolated amylose powder. It involves autoclaving a slurry of an isolated amylose having an intrinsic viscosity of 1.3–2.9 at 191° C. (375° F.) under 5–140 psig of pressure for 1–60 minutes at 0.1–25% solids, cooling the dispersion to 90° C. (194° F.), and drum-drying on a 110°–200° C. (230°–392° F.) surface. The retention time on the drum is 40–75 seconds using a nip gap of 0.001 inch or less. The resulting powders have amorphous X-ray diffraction patterns, intrinsic viscosities of 1.3–2.9, and form irreversible gels when redispersed.

Pregelatinized starches may be made by a two step spray-drying process which is in current industrial use. Modifications of this conventional process are described in U.S. Pat. No. 2,314,459 (issued Mar. 23, 1943 to A. A. Salzburg) and U.S. Pat. No. 3,332,785 (issued Jul. 25, 1967 to E. Kurchinke). In the typical process an aqueous starch slurry is cooked, usually by atmospheric vat cooking or by cooking in a heat exchanger or by steam injection jet-cooking, held at atmospheric pressure in a tank (often a cooking tank in batch processes or a receiver tank for pressurized cooking processes), and subsequently spray-dried. The post-cooking holding period allows the batchwise addition of additives, temperature regulation, and/or cooking at rates which do not match the spray-dryer capacity. On exiting the holding tanks the temperature of the feed to the spray-dryer may range from 38°–93° C. (100°–200° F.). Atomization is effected by a single fluid pressure nozzle, a centrifugal device, or a pneumatic nozzle. This process is usually limited to "thin-cooking starches", i.e., converted starches where the polymeric structure has been degraded by acid hydrolysis, enzymatic degradation, oxidation and/or high levels of mechanical shear. Converted starches can be used at higher solids because their pastes are lower in viscosity and can be atomized. The cooks of unmodified starches are difficult to atomize because of their high viscosity and therefore, if spray-dried, are processed at low solids. Another limiting factor of conventional processes is that, at temperatures achieved at atmospheric pressure, many polymers associate and/or retrograde causing an increase in viscosity. See U.S. Pat. No. 3,607,394 discussed below.

U.S. Pat. No. 3,607,394 (issued Sep. 21, 1971 to F. J. Germino et al.) is directed to a process for preparing a pregelatinized, cold water dispersible starch from a granular starch which contains at least 50% amylopectin (i.e., not more than 50% amylose). Suitable starches include cereal starches such as corn, wheat and barley, tuber starches such as potato and tapioca, and waxy starches such as waxy maize, waxy rice, and waxy sorghum. The high amylose starches, those which contain 60% or more amylose, as well as isolated amylose itself, are not suitable because their gelling characteristics are undesirable for the applications contemplated (i.e., where smooth pastes having a low initial viscosity and minimal setback). The process involves pasting at at least 149° C. (300° F.), with the upper limit being that at which substantial molecular degradation of the starch occurs, e.g., over about 232° C. (450° F.). The starch paste is then dried very rapidly in any suitable apparatus, e.g., a drum-dryer, spray-dryer, belt dryer, foam mat dryer or the like. The only requirement is that the apparatus be capable of drying the starch paste very rapidly to prevent retrogradation or aggregation prior to removal of the water. Also it is preferred that the paste be fed to the dryer very quickly because the longer it is held at a high temperature the greater is the likelihood of degradation. Structurally the products are characterized by complete granular fragmentation.

It is well known that high amylose starches are especially difficult to disperse and require higher temperatures and higher shear levels than low amylose starches such as corn, potato, wheat, rice, tapioca, and the like. Autoclaving or indirect heating, such as in a heat exchanger, are cooking processes that tend to produce dispersions that are complex colloidal mixtures, especially with the difficult to disperse high amylose starches. The mixtures consist of intact granules, residual granular fragments and dissolved polymer. Jet-cooking provides appropriate shear levels and more readily gives a dispersion approaching complete solubility at a molecular level (see U.S. Pat. Nos. 2,805,966 (issued Sep. 10, 1957 to O. R. Ethridge); 2,582,198 (issued Jan. 8, 1957 to O. R. Ethridge); 2,919,214 (issued Dec. 29, 1959 to O. R. Ethridge); 2,940,876 (issued Jun. 14, 1960 to N. E. Elsas); 3,133,836 (issued May 19, 1964 to U. L. Winfrey); and 3,234,046 issued Feb. 8, 1966) to G. R. Etchison). This more effective dispersion by jet-cooking provides a lower in-process viscosity, without degradation, than other cooking methods. This allows the use of lower cooking and conveying temperature and pressure which further assists in reducing degradation.

Therefore, there is a need for a spray-drying process which converts crystalline polymers to a substantially amorphous, i.e., "glassed" form, without substantial degradation by thoroughly cooking and drying water-dispersible or water-soluble natural polymers, such as unconverted starches and gums, or synthetic polymers such as polyvinyl alcohol at commercially acceptable solids concentration.

There is also a long felt need for a cooking and drying process that transforms cold-water-insoluble, partially insoluble, or slow to hydrate polymers (natural or synthetic) into new spray-dried powder forms which disperse in cold water and are substantially non-crystalline, non-retrograded and non-degraded by the process. The prior art teaches many methods that produce pre-dispersed polymers, but the resulting polymers do not possess the full range of desired properties. There is a need for a process which thoroughly cooks and spray-dries crystalline polymers, such as converted starches, at higher solids than is currently possible.

In particular, there is a need for the following:

i) pregelatinized, spray-dried, fully pre-dispersed high amylose starches (modified or unmodified) which disperses in water (i.e., high amylose starches which are substantially cold-water-soluble and completely hot-water-soluble) and whose redispersions give strong gels with improved textural properties;

ii) fully pre-dispersed, spray-dried forms of modified or unmodified natural gums (which are inherently poorly dispersible due to crystalline or associated regions), especially polygalactomannan gums whose backbones are more linear in nature and have a tendency to associate to form crystalline regions, such as locust bean gum, and whose spray-dried forms yield cold-water redispersions with the solution properties of the parent gum.

iii) fully pre-dispersed, spray-dried forms of synthetic polymers which are inherently poorly dispersible due to crystalline or associated regions, especially substantially fully hydrolyzed polyvinyl alcohols and whose spray-dried forms yield cold-water redispersions with the solution properties of the parent polymer.

SUMMARY OF THE INVENTION

The coupled jet-cooking/spray-drying process described herein is a continuous process for jet-cooking and spray-drying an inherently water-dispersible or water-soluble polymer which is insoluble in cold water because of the presence of crystalline regions and which can be disoriented by heating, yielding a dispersion or solution which is low in viscosity at elevated temperatures. The process comprises the steps of:

(a) forming a slurry or a paste comprising the polymer and water;

(b) jet-cooking the aqueous slurry or paste of the polymer with steam at a temperature sufficient to fully disperse or solubilize the polymer;

(c) immediately conveying and introducing under elevated temperature and pressure the jet-cooked dispersion or solution into a nozzle of a spray-dryer chamber;

(d) atomizing the jet-cooked dispersion or solution through the nozzle of the spray-dryer;

(e) drying the atomized mist of the jet-cooked polymer within the spray-dryer chamber; and (f) recovering the jet-cooked and spray-dried polymer as a water-dispersible or water-soluble powder.

The cooking temperature used will depend upon the polymer. The use of too high a cooking temperature may degrade a polymer such as starch. Suitable temperatures are about 93°–177° C. (200°–350° F.) for most polymers, 138°–177° C. (280°–350° F.) for starches containing about 70% amylose, 121°–162° C. (250°–325° F.) for starches containing less than about 40% amylose, 104°–149° C. (220°–300° F.) for low viscosity cold-water soluble starches, 99°–163° C. (210°–325° F.) for fully hydrolyzed polyvinyl alcohol and 93°–163° C. (200°–325° F.) for natural gums.

The cooking chamber pressure used in the continuous coupled process is low, typically 20 to 150 psig, and is the saturation pressure of steam at the temperature used plus the small incremental pressure needed to move the dispersion through the chamber. Cooking chamber pressures suitable for high amylose starches are 80 to 150 psig, most preferably 100 to 130 psig for a starch having an amylose content of about 70%.

Excessive shear, like too high a cooking temperature, will degrade a polymer such as starch and should be avoided unless a converted (i.e., degraded) starch is desired.

An essential step in the present process is the conveying of the thoroughly cooked, substantially fully dispersed polymer, under elevated pressure and temperature, to the spray-dryer atomization nozzle. In the preferred method, a low shear pneumatic nozzle is used, and the transfer is carried out at substantially the same temperature and pressure used in the jet-cooking. The transfer is carried out without any venting to the atmosphere. A pressure nozzle can be used for atomization. However, its use adds operational complexity to the process and may shear the dispersion, thus producing a degraded product.

One of the advantages of the coupled jet-cooking/spray-drying process is that it produces a fully pre-dispersed polymer, processed without substantial degradation and dried without substantial retrogradation or reassociation, which maximizes useful properties. The spray-dried powders redisperse in water to give dispersions with unexpected smooth textures and high viscosities or strong gel strengths.

Another advantage of the present continuous coupled process is that hydrolyzed starches having a water fluidity (W. F.) of about 80, which are conventionally spray-dried at 27% solids, are easily processed at 38% solids. Thus, the present process is limited only by the viscosity of the feed into the jet-cooker.

A further advantage of the present process is that low solids are not required for proper atomization of starches of higher viscosity. Prior art conventional processes with separated cooking and spray-drying steps are less advantageous when atomizable viscosities can only be obtained at low solids. In those two step processes, with 70% amylose starch, the cooled starch dispersion at atmospheric pressure is too viscous to spray-dry due to retrogradation or gel formation if the solids content of the starch slurry is above 10% solids. In the continuous coupled, jet-cooking/spray-drying process the thoroughly cooked, hot dispersion is only slightly more viscous than water, even when the solids are 25%, and hence the dispersion can be easily spray-dried.

One disadvantage of cooking the starch slurry in a tubular heat exchanger, such as that used by Winkler in the examples of U.S. Pat. No. 3,630,775 (discussed in the Background) is the higher temperature required since the slurry is indirectly heated rather than directly heated as with jet-cooking. The processing conditions used by Winkler in the high amylose starch example suggest that there were difficulties in dispersing the starch since the lowest percent solids, highest temperature and longest dwell time were used during cooking. Another disadvantage is the high pressure (above 1000 psi) required to transport the less than optimally dispersed starch through the heat exchanger and to atomize the dispersion using a single fluid pressure nozzle. A single fluid pressure nozzle is an extremely high shear atomization device which can cause molecular breakdown of high solids starch dispersions, hence altering viscosity and functionality. In contrast, in the continuous coupled jet-cooking/spray-drying process, the operating pressure when the preferred pneumatic nozzle is used is less than 150 psig. Atomization is thus accomplished with less shear and minimum degradation results, thus maintaining viscosity or gelling properties of the original polymer. See Example XI which compares starches cooked in an heat exchanger and atomized through a single fluid pressure nozzle with starches cooked in a jet-cooker and atomized through a pneumatic nozzle.

All of the starches which are pregelatinized using the present process can be prepared in the form of fully pre-dispersed, non-granular starches which are substantially non-crystalline (i.e., they are amorphous "glassed" solids). The jet-cooked dispersions are fully dispersed and do not contain granules or granular fragments; they are fully dispersed. Such pregelatinized starches are highly water-soluble and substantially non-degraded, i.e., the molecular weight of the processed starch is not substantially less than that of the unprocessed base starch. When the starch base is other than a high amylose starch, such as corn, tapioca, potato, waxy maize, and the like, the resulting pregelatinized starch powder is completely cold-water-soluble (CWS). When the starch base is a high amylose starch, the resulting pregelatinized starch powder is very soluble. For example, a hybrid corn starch having an amylose content of about 70% processed by the present process has cold and hot water solubilities of about 70% and 99%, respectively. These pregelatinized high amylose starch powders give high viscosity solutions when redispersed in hot water. The split second drying time during processing minimizes association through hydrogen bonding so that the resulting starches are substantially non-retrograded.

The unique spray-dried pregelatinized high amylose starches and their mixtures with other starches prepared by the present process form strong gels when redispersed in hot water (90°–100° C.–194°–212° F.) and cooked in a boiling water bath for 15 minutes. The gel strength is about 230–240 g/cm$^2$ at 6% solids for a high amylose starch containing about 70% amylose, which is equivalent to the maximum gel strength obtained when the same starch is jet-cooked independently under optimum cooking conditions). Strong gels are also formed when these pregelatinized starches are redispersed in cold water (25° C.–77° F.) and not cooked (150–160 g/cm$^2$ at 6% solids for a high amylose starch containing about 70% amylose). As is shown in Example XI, the starch is not degraded as is the starch pregelatinized using the Winkler process (see U.S. Pat. No. 3,630,775 discussed in the Background). A spray-dried starch having an amylose content of about 70% which is pregelatinized using the present coupled process has an intrinsic viscosity between 0.7–0.9. The intrinsic viscosity of the non-processed base is typically between 0.9–1.0. This demonstrates that the present process produces a substantially non-degraded starch since the molecular weight of the processed starch is similar to that of the base starch from which it is derived.

Typical high amylose starches include those having an amylose content of about 100% (e.g., isolated potato amylose) or 4%–70% (e.g., corn hybrids) and the starch may be modified by derivatization, conversion, or complexing. Modification by crosslinking is possible but not desirable as the advantage of the present process is the preparation of soluble starches. Lightly crosslinked starches that can be fully dispersed are suitable, whereas heavily crosslinked starches that are not fully dispersed during cooking are not suitable.

The starches prepared by the coupled process are amorphous white powders with particles having the shape typical of spray-dried starches, i.e. a convoluted indented sphere. However, unlike other conventionally spray-dried non-granular high amylose starches processed at low solids, the high amylose starch is substantially fully and completely disorganized as evidenced by amorphous X-ray patterns, substantially non-retrograded as evidenced by amorphous X-ray patterns and optimum gel strengths, and substantially non-degraded as evidenced by intrinsic viscosities that are similar to the base starch.

The high amylose starches prepared by the present coupled jet-cooking/spray-drying process are more completely dispersed than those prepared by the autoclaving and drum-drying process of Sarko, U.S. Pat. No. 3,086,890 (discussed in the Background). This is evidenced by the significantly higher gel strengths. For example, the pregelatinized starch having an amylose content of about 70% prepared by the continuous coupled jet-cooking/spray-drying process has a gel strength of about 160 g./cm.$^2$ when redispersed in hot water at 6% solids, while the same base starch prepared by jet-cooking and drum-drying has a gel strength of only about 110 g./cm$^2$ when redispersed in hot water at 6% solids. This difference in gel strength is unexpected and an indication that the coupled continuous process produces a different product, i.e., a substantially fully disorganized and non-retrograded product. The autoclaving and drum-drying process of Sarko uses, as a starting material, a previously processed starch fraction (isolated amylose) which is prepared by high temperature cooking, precipitation of the desired fraction, and recovery by drying. In the present process, isolated starch fractions are usable, but native (non-cooked) starches are preferred.

The high amylose starch powders prepared by the coupled jet-cooking/spray-drying process are significantly more dense than pregelatinized starches prepared using a conventional two step process which involves jet-cooking and then spray-drying a low solids aqueous dispersion of the jet-cooked starch, as shown in example XIII and discussed in Example XIV. The high amylose starch powders obtained herein also form a significantly firmer gel (about 200 versus 45–90 g./cm.$^2$ at 6% solids when redispersed in hot water).

The high amylose starch powders and other starch powders prepared by the coupled jet-cooking/spray-drying process are completely non-granular unlike the pregelatinized starches prepared by cooking the starch in an atomized state. As described in U.S. Pat. No. 4,280,851 (discussed in the Background), the simultaneously cooked and spray-dried starches are uniformly gelatinized granules in the form of indented spheres with a majority of the granules being whole and unbroken and swelling upon rehydration. In attempting to carry out this process with a high amylose starch (about 70% amylose), we have observed that it is difficult to prepare a highly soluble product. The high amylose starch is resistant to gelatinization under the processing conditions described in this reference.

BRIEF DESCRIPTION OF THE DRAWINGS

FIG. 7 compares the displacement density and bulk density of various pregelatinized starches (potato amylose, high amylose corn, potato, corn, tapioca and waxy maize) prepared by the continuous coupled jet-cooking/spray-drying process, a conventional spray-drying process, and the jet-cooking/drum-drying, a process similar to that of Sarko (U.S. Pat. No. 3,086,890).

DESCRIPTION OF THE PREFERRED EMBODIMENTS

Figure 1:
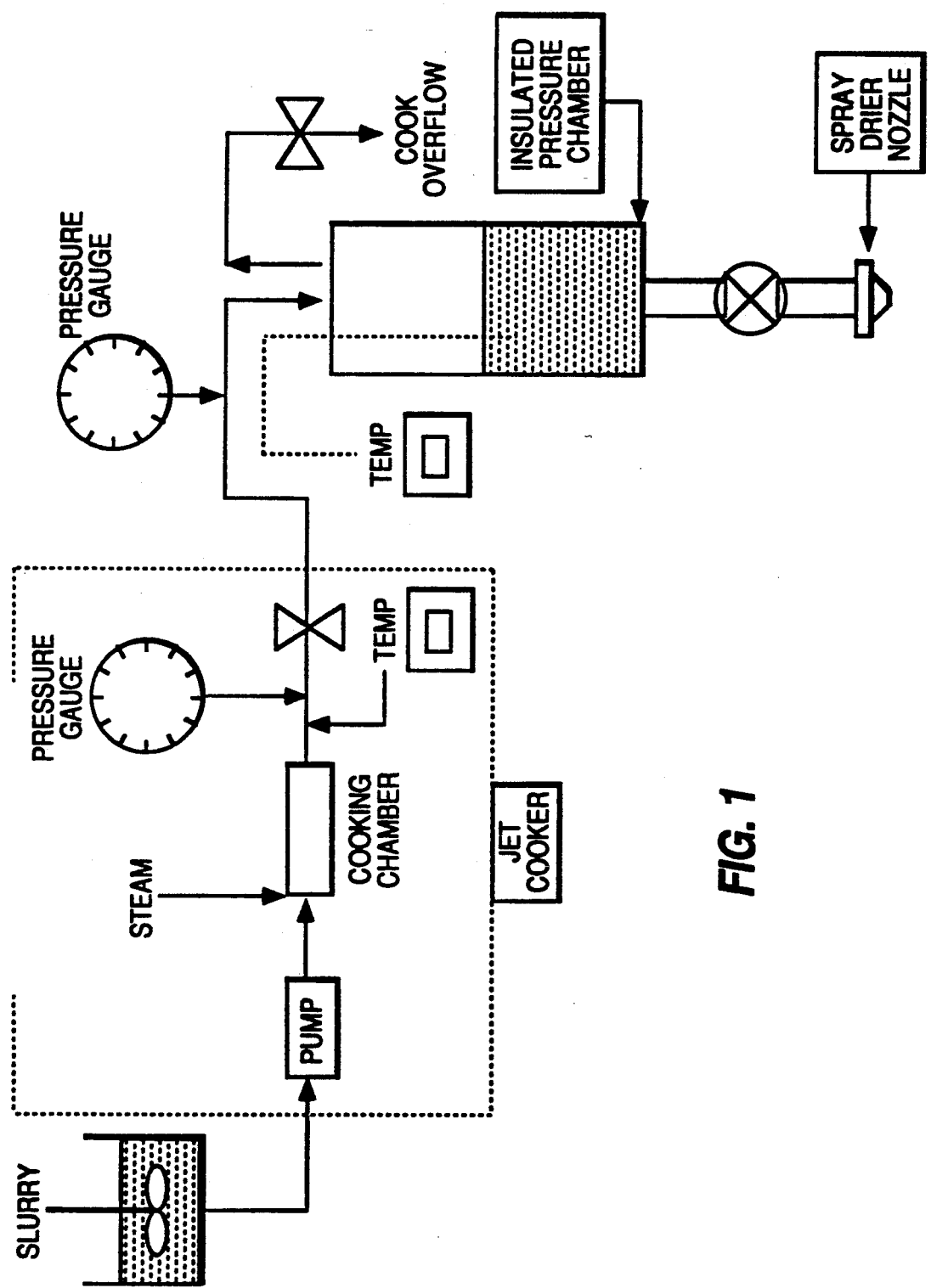
FIG. 1 shows the high temperature viscometer, a measurement device used to carry out the high-temperature flow rate viscosity measurement.

As used herein, the term "crystalline" polymer refers to any natural or synthetic polymer which contains crystalline regions or domains which must be disorganized to render the polymer amorphous and hence dispersible or soluble in cold water. Suitable polymers for use in the present process are those which develop a high viscosity after dispersion in hot water and whose aqueous dispersions have a reduced viscosity at elevated temperatures. Suitable natural polymers include water-dispersible or water-soluble polysaccharides such as starches, gums and cellulose derivatives. Suitable synthetic polymers include polymers such as fully hydrolyzed, medium to very high molecular weight polyvinyl alcohols.

Any cookable, granular unmodified or modified starch or previously cooked starch (including those not fully dispersed) other than a highly crosslinked starch is suitable as a starting material for use in the present process. Different types of suitable base starches include those from cereal grains, such as corn, milo, wheat and rice; those from tubers, such as potato, tapioca, and arrowroot; and those that are waxy starches, such as waxy milo, wavy maize, and waxy rice.

As used herein, the term "high amylose starch" refers to starches from any starch base which contain concentrations of at least about 40% amylose, including, for example, high amylose corn, wrinkled pea, and 100% amylose isolated from a starch such as potato starch. It also refers to mixtures of a high amylose starch and starches having an amylose content below 40%, such as waxy maize, corn, tapioca, potato, rice and the like. The mixtures can be processed and yield a mixed powder with good gelling properties, provided the mixture has a total amylose content of at least 35%. The preferred high amylose starches are those derived from high amylose corn hybrids.

Jet-cooking is a conventional process which involves the instantaneous heating of a flowing liquid (in the present process an aqueous suspension, also referred to as a slurry or paste) with a hot condensable vapor (in the present process stem) and holding the heated liquid at a selected temperature for a selected time. Various apparatus suitable for jet-cooking are referred to in the Background. Suitable cookers are available from National Starch and Chemical Corp (United States), Avebe (Holland), or Roquette Freres (France).

Spray-drying is likewise a conventional process and described in *Spray Drying: An Introduction to Principles, Operational Practice and Applications* by K. Masters, published in 1972 by Leonard Hill Books, a division of International Textbook Co. Ltd., London. Spray-dryer nozzles suitable for use herein include pressure nozzles and pneumatic-type nozzles such as two-fluid nozzles.

In a pneumatic nozzle, the liquid to be atomized (here the cooked polymer dispersion) and an atomizing gas (air or steam) are fed separately to the nozzle at pressures generally between 50 psig and 200 psig. Atomization is effected by impinging the pressurized atomizing gas on a stream of the liquid at a velocity sufficient to break the stream into droplets. In the present invention, pressure (and the resulting velocity) of the atomizing gas must be sufficient for propert atomization into small droplets to allow rapid drying to an appropriate residual moisture without retrogradation or reassociation. Use of pneumatic nozzles is preferred in the coupled jet-cooking/spray-drying process due to the low operating pressures (similar to those needed for jet-cooking) and the low shear on the feed inherent in this design. Pneumatic nozzles are discussed in greater detail on pages 16 f of Master's book cited above.

Pressure nozzles may also be used for atomization. Atomization, in a pressure nozzle, is effected by inducing rotation in the liquid and passing it through a small orifice. The liquid, on exiting the orifice, forms a cone-shaped film which is unstable, breaking into droplets. Use of a pressure nozzle in the present process requires insertion of a high pressure pump (2,000 to 10,000 psig) between the jet-cooker and the atomization nozzle. The temperature after passage through the high pressure pump should be maintained substantially equivalent to the jet-cooking chamber temperature. The pressure after the high pressure pump must be sufficient to properly atomize the dispersion into small droplets to allow rapid drying to an appropriate residual moisture without retrogradation or reassociation. Use of a pressure nozzle adds operational complexity to the present process and may shear the dispersion, thus producing a degraded product. Suitable pressure nozzles are also described in the Masters reference cited above.

For example, in the present process a starch slurry (up to 38% anhydrous basis) is prepared. The starch slurry is then directed through a cooking chamber, mixed with high temperature steam (at 80-150 psig), and gelatinized in a continuous jet-cooker. The starch is cooked at a solids and temperature sufficient to reduce its viscosity at elevated temperature to a low range (near that of water), without significant degradation.

The exit of the cooking chamber is connected to a spray-nozzle, preferably a pneumatic-type spray-nozzle, situated in a spray-dryer. The starch cook, while still at a high temperature and low viscosity, is directed into the spray-nozzle and atomized with cold air, hot air or steam. Once the hot jet-cook has been atomized, it is handled in the same manner as conventional spray-dried starches.

The continuous coupled process is economical. It provides high flow rates through a given spray-dryer orifice at high starch solids but at pressures that are low enough to minimize degradation of the starch.

The coupled process is versatile. The processing equipment may be arranged to optionally add other materials during the jet-cooking step. For example, (1) a water-soluble compound such as sugar or a water-dispersible compound such as a gum can be added to a starch slurry and a spray-dried mixed powder obtained; (2) a water-insoluble compound, such as an oil, can be added to the starch and a starch powder containing encapsulated oil obtained; (3) a complexing agent such as a surfactant can be added to a starch slurry and a starch-surfactant complex obtained; (4) an acid may be added to the slurry and an acid-converted starch product obtained; or (5) a derivatizing agent may be added to the slurry and a derivatized starch product obtained. The processing equipment can also be arranged to provide for post-drying treatments such as the agglomeration of the starch powder, or a heat-moisture treatment of the starch powder.

The above procedure (encapsulation, complexation, conversion, derivatization, agglomeration, and heat treatment) are well-known starch modifications and described, for example in Chapter 22: *Starch and Its Modification* by M. W. Rutenberg in *Handbook of Water-Soluble Gums and Resins*, edited by Robert L. Davidson and published by McGraw Hill Book Co., New York 1980 or in the patent literature.

Jet-cooks of a high amylose starch (about 70% amylose) maintained at temperatures from 126°-153° C. (259°-307° F.) flow through spray-drying nozzles at rates no less than half that of water, even at a 28% cook solids. This translates into a flow viscosity of less than 1 centipoise at temperatures of 109°-145° C. (228°-293° F.). The viscosity of a 28% solids jet-cook of the same starch cannot be measured after it exits the cooker and drops in temperature to below 100° C. (212° F.) since it forms a gel in a few seconds. Therefore, flow rates are measured instead of viscosity. Accurate viscosity measurements of non-Newtonian liquids such as starch cooks are very difficult to measure.

Starch cook viscosities (by flow rate comparison with water) decrease with increasing temperature, decreasing molecular weight, decreasing solids, and increasing amylose content (e.g., a high amylose starch having an amylose content of about 50% is more viscous than a high amylose starch having an amylose content of about 70%).

In the examples which follow, all temperatures are in degrees Celsuis and Fahrenheit. All spray-drying nozzles are obtainable from Spray Systems Co., Wheaton, Ill. The following test procedures were used.

Water Solubility

A. Cold Water Solubility

The determination is carried out using distilled water at room temperature. About 0.5 g. of starch is dispersed in 30-40 ml. of water in a semi-micro stainless steel cup on a Waring blender base (Model 31B292). The blender is run at low speed while the starch is added (all at once) and then run at high speed for 2 minutes. The dispersion is immediately transferred to a 50 ml. volumetric flask and diluted to 50 ml. with water. A 25 ml. portion of the stock dispersion (shaken well to ensure a homogenous dispersion) is removed by pipet and transferred to a 50 ml. centrifuge tube. The sample is spun down at 1800-2000 RPM for 15 minutes. Once spun down, 12.5 ml. of supernatant is pipetted into a 25 ml. volumetric flask, 5 ml. of 5N potassium hydroxide (KOH) are added with swirling, and the mixture is diluted with water. The remainder of the stock dispersion is shaken well, the insoluble starch dispersed with 10 ml. of 5N KOH while swirling. The mixture is diluted to 50 ml. with water. The optical rotation of both the concentrated stock solution (B) and the supernatant solution (A) is measured.

$$\% \text{ Cold Water Solubles} = \frac{\text{Optical Rotation of Supernatant/Path Length of Supernatant}}{\text{Optical Rotation of Stock Solution/Path Length of Stock Solution}} \times 100$$

B. Hot Water Solubility

The procedure is the same as that described above except that boiling distilled water at 90°-100° C. (194°-212° F.) is used for dispersing the starch and all subsequent dilutions. No attempt is made to maintain temperature during the procedure.

Fluidity Measurements

A. Water Fluidity (W. F.)

This test is described in U.S. Pat. No. 4,207,355 issued Jun. 10, 1980 to C. W. Chiu et. al., the disclosure of which is incorporated herein by reference.

B. Calcium Chloride Viscosity (7.2% Solids Test)

The calcium chloride viscosity of the converted high amylose starch is measured using a Thomas Rotation Shear-Type Viscometer standardized at 30° C. (86° F.) with a standard oil having a viscosity of 24.73 cps., which oil requires 23.12 % 0.05 seconds for 100 revolutions. As the conversion of the starch increases, the viscosity of the starch decreases and the calcium chloride viscosity decreases. Accurate and reproducible measurements of the calcium chloride viscosity are obtained by determining the time which elapses for 100 revolutions at a specific solids level.

A total of 7.2 9. of the converted starch (anhydrous basis) is slurried in 100 g. of buffered 20% calcium chloride solution in a covered semi-micro stainless steel cup (250 ml. capacity available from Eberbach), and the slurry is transferred to a glass beaker and is heated in a boiling water bath for 30 minutes with occasional stirring. The starch solution is then brought to the final weight (107.2 g.) with hot (approximately 90°–100° C.–194°–212° F.) distilled water. The time required for 100 revolutions of the resultant solution at 81°–83° C. (178°–181° F.) is measured three times in rapid succession and the average of the three measurements is recorded.

The calcium chloride solution is prepared by dissolving 264.8 g. of reagent grade calcium chloride dihydrate in 650 ml. of distilled water in a tared 1 1. glass beaker. Thereafter 7 2 g. of anhydrous sodium acetate is dissolved in the solution. The solution is allowed to cool and the pH is measured. If necessary, the solution is adjusted with hydrochloric acid to pH 5.6±0.1. The solution is then brought to weight (1007.2 g.) with distilled water.

Gel Strength

A gel is prepared by dispersing a starch sample (on an anhydrous basis) in boiling distilled water (approximately 90°–100° C.–194°–212° F.) at appropriate solids in a Waring blender (Model 31B292) set at low speed for 2 minutes, transferring to a glass beaker, then cooking the sample in a boiling water bath for 15 minutes. The sample is brought back to weight with boiling distilled water and is then placed in a jar covered with a lid and allowed to cool undisturbed for 24 hours at 21° C. (70° F.) to gel. Unless stated otherwise, all gels are prepared in boiling water and cooked as stated above. For cold water strengths, the gel is made in room temperature (25° C. gel 77° F.) distilled water without cooking. The strength is measured using a Stevens LFRA Texture Analyzer (available through Texture Technologies Corp., Scarsdale, N.Y.) employing a 0.25 in. diameter cylindrical probe, run at a speed of 0.5 mm./sec. The force in g./cm.$^2$ required for the probe to penetrate the gel a distance of 4 mm. is measured three times and the average is recorded. The solids and probe selection are varied according to the starch type. For example, all high amylose corn starches (about 70% amylose) and isolated potato amylose (about 100% amylose) were tested with a 0.25 in. diameter cylindrical probe at 6% solids (dry basis). Unless stated otherwise, these conditions can be assumed.

Brookfield Viscosity

Brookfield viscosity is measured using a RVF Brookfield viscometer (available through Brookfield Engineering Laboratories, Inc., Stoughton, Mass.) and an appropriate spindle at 20 rpm. The instrument is allowed to rotate five times before a reading is taken. All viscosity readings are run at 22° C. (72° F.), and all test dispersions are prepared using the above gel strength procedure unless stated otherwise.

Intrinsic Viscosity Determination

The intrinsic viscosity of starch is measured by quantitatively transferring 2.500 g.±0.001 g. of anhydrous starch into a 600 ml. beaker containing about 250 mls. of distilled water at about 25° C. (77° F.). Then 100 mls. of 5N±0.05N KOH solution are pipetted into the beaker, and the mixture is stirred for 30 minutes on a stir plate. This solution is clear and does not contain undissolved starch. The solution is quantitatively transferred to a 500 ml. volumetric flask and is brought to volume with distilled water. The solution is filtered through a funnel packed with glass wool. Then 40.0, 30.0, 20.0 and 10.0 mls. of this solution are pipetted into 50 ml. volumetric flasks and brought to volume with 1N±0.10N KOH solution. The flow times for each concentration (0.40, 0.30, 0.20 and 0.10% solids plus the stock solution at 0.50% solids) and the flow time of the 1N KOH solution is determined in a Cannon-Fenske Viscometer (No. 100, 45–65 seconds flow time for water at 35° C.) mounted in a constant temperature bath maintained at 35.00°±0.02° C. The flow times for each dilution are run in triplicate. The intrinsic viscosity is the point at which the extrapolated line of a plot of $N_{sp}$/concentration (y-axis) versus concentration (x-axis) intercepts the y-axis. $N_{sp} = N_{rel} - 1$ and $$N_{rel} = \frac{\text{flow time of starch solution}}{\text{flow time of 1 N KOH}}.$$

Viscosity by Flow-Rate Measurement

The device used for high-temperature flow-rate viscosity measurement is shown in FIG. 1. It is used to measure the flow rate of fluids under high temperature/pressure conditions. A jet-cooker is used to raise the temperature/pressure of these fluids. The high temperature starch cook viscosity is determined by comparing its flow rate to that of water under identical conditions. Solids concentration are stated in the Examples.

The "small" nozzle orifice, which has an opening of 0.016 in., is used for low solids cooks (spraying systems fluid cap 40100). The "large" nozzle orifice, which has an opening of 0.031 in., is used for high solids cooks (fluid cap 600100).

A. Cooked Starch Flow Rate Measurement

The starch is slurried in water at the desired solids and adjusted to approximately pH 6 with dilute sulfuric acid or sodium hydroxide as required. The slurry is then jet-cooked at temperatures between 149°–155° C. (300°–311° F.). The starch cook is then directed (while kept at temperature) into an insulated steel chamber fitted with a spray-drying nozzle and an overflow line to flash off excess steam and to control pressure. The valve opening to the overflow line is adjusted to bring the pressure and thus the temperature to the desired point and to eliminate any excess steam. Gases (steam) in the liquid stream cause an uneven flow ("spitting") and must be eliminated to provide accurate flow results. Once the pressure/temperature have been adjusted and steam has been eliminated, a valve is opened to allow flow through the spray-drying orifice while maintaining constant pressure. Simultaneously, a graduated cylinder is placed under the orifice and a timer is started. A sample is collected for approximately 30 seconds, from which the flow rate per minute is calculated. Water is run through this procedure and is used as the standard for comparison.

B. Water Flow Rate Measurement

Water was run at 20, 40 and 60 psig of pressure to obtain temperatures of 126°, 142°, and 153° C. (259°, 287°, 307° F.) using the procedure given above. The results are shown below:

| Orifice Size (in.) | Pressure (psig) | Temperature of Fluid °C. (°F.) | Flow Rate (ml./minute) |
|---|---|---|---|
| 0.016 | 20 | 126 (259) | 100 |
| 0.016 | 40 | 142 (287) | 138 |
| 0.016 | 60 | 153 (307) | 180 |
| 0.031 | 20 | 126 (259) | 360 |
| 0.031 | 40 | 142 (287) | 600 |
| 0.031 | 60 | 153 (307) | 699 |

Powder Density

A) Bulk Density

A tared 100 cc. graduated cylinder is filled to the 100 cc. mark with "as is" test sample powder. The cylinder is tapped on a hard surface until no further drop in volume is noted.

$$\text{Bulk Density} = \frac{\text{g. of starch}}{\text{cc. of packed volume}} \times 62.427 = \text{lbs./ft.}^3$$

B) Displacement Density

A Hubbard-Carmick, 25 ml. capacity, specific gravity bottle is tared and a small amount of anhydrous glycerin is added to wet out the bottom of the bottle. A known amount of starch (about 5 g. "as is") is weighed into the bottle and the bottle is filled about half way with more glycerin. After mixing, the bottle is filled within $\frac{1}{4}$ to $\frac{1}{8}$ inch of the top with glycerin and placed under a vacuum until all air bubbles are dissipated. Glycerine is added to completely fill the bottle and the total weight is taken. The procedure is run with glycerin alone (no starch) to determine the volume of the bottle. All work must be done at 25° C. (77° F.).

$$\text{Volume of Bottle} = \frac{\text{Weight of glycerin (no starch)}}{\text{Specific Gravity of glycerin}}$$

$$\text{Volume of Glycerin} = \frac{\text{Weight of glycerin (with starch)}}{\text{Specific Gravity of glycerin}}$$

Volume of Starch = Volume of bottle − Volume of glycerin $$\text{Displacement Density} = \frac{\text{Weight of Starch}}{\text{Volume of Starch}} = \text{g./cc.}$$

EXAMPLE I

This example shows the preparation of pregelatinized non-granular high amylose corn starches (about 70% amylose).

Part A—Preparation at Lower Cook Solids (13%)

An unmodified granular high amylose starch was slurried in water and pumped using a gear pump into a jet-cooker. Steam (at 145 psig) was metered into the slurry stream and the starch was cooked. The hot starch cook was conveyed at a temperature and pressure only slightly reduced from the cooking chamber to a pneumatic atomization nozzle bottom mounted in a spray-dryer. Compressed air was used to atomize the starch. Hot air in counter-current flow was used to dry the atomized starch mist. The resulting powders were recovered in a cyclone separator. The process variables used are shown in Table I. The spray-dryer is a laboratory Model No. 1 Anhydro spray-dryer.

The effect of cooking shear on the gel strength of starch powders redispersed at 6% solids in hot water is shown. The shear was varied by varying the amount of gaseous steam present in the starch cook as it moved through the cooker. At lower shear levels (20.0 g./min. of steam flow), the starch was not thoroughly and efficiently cooked, and this was reflected in less than maximum gel strength (194 g./cm.$^2$) (see Column 1). At optimum shear levels for this system (24.0 g./min. steam flow) a maximum gel strength of 215 g./cm.$^2$ was achieved. Increasing the shear by using a steam flow of 36 or 62 g./min. resulted in lower gel strengths (204 and 134 g/cm.$^2$) (see columns 3 and 4). Proper shear must be determined experimentally and it will depend on the starch used, the hydraulic characteristics of the cooking and atomizing equipment used, and the cooking temperature, as well as the gel strength required for the desired end use.

Part B—Preparation at Higher Cook Solids (28%)

The process variables used for jet-cooking/spray-drying in larger scale equipment at higher solids are shown in Column 5 of Table 1. The slurry of unmodified granular high amylose starch was fed into a jet-cooker (Model C-15 available from National Starch and Chemical Corp). Steam was metered into the slurry as above. The cooked starch was conveyed to a pneumatic atomization nozzle top mounted in a 35 ft. tall, 16 ft. diameter Hensey spray-dryer. Steam at 120 psig was used to atomize the starch. The atomized starch mist was dried with air at 204° C. (400° F.).

The cold water solubility of the above non-granular starch powders was 97.4% and the hot water solubility was greater than 99%.

The types of pneumatic nozzle set-ups used in the spray-dryers are indicated in the Table and available from Spraying System Inc.

EXAMPLE II

This example demonstrates the processing of a converted high amylose corn starch (about 70% amylose) using the coupled jet-cooking/spray-drying process. A slurry of the starch was treated with 2.5% hydrochloric acid at 52° C. (126° F.) for 16 hours to give a converted starch having a calcium chloride viscosity of 25 seconds. After neutralization with sodium carbonate to a pH of about 6, the granular converted starch was filtered, washed and dried. The starch was then jet-cooked using the following conditions: 21% cook solids, 143° C. (290° F.) cooking temperature, 27 g./min. steam flow, and 39.7 ml./min. cooking rate. The jet-cooked starch dispersion was spray-dried through a two-fluid Spray Systems nozzle (set-up 22) into a Niro Utility #1 spray-dryer. The inlet temperature was 250° C. (428° F.) and the outlet temperature was 88° C. (190° F.). The starch powder was 93.0% soluble in cold-water and 97.1% soluble in hot-water.

EXAMPLE III

This example demonstrates that a blend of a high amylose corn starch and another starch can be processed using the coupled jet-cooking/spray-drying process. About 35 parts of a converted high amylose corn starch (about 70% amylose and calcium chloride viscosity of about 25 seconds) was slurried with about 65 parts of a converted corn starch (about 28% amylose and water fluidity of 65) in 150 parts of water. The following jet-cooking conditions were used: 23% cook solids, 143° C. (290° F.) cooking temperature, 27.5 g./min. steam flow, and 39 ml./min. cooking rate. The jet-cooked starch dispersion was spray-dried through a two-fluid Spray Systems nozzle (set-up 22B) into an Anhydro laboratory Model No. 1 spray-dryer. The inlet temperature was 230° C. (446° F.) and the outlet temperature was 86° C. (187° F.).

The resulting non-granular starch powder was 95.1% soluble in cold water and greater than 99% soluble in hot water. On redispersion in hot water at 6% solids it formed a gel having a strength of 42 g./cm.$^2$. The fluidity corn starch processed under similar conditions did not gel. The fluidity high amylose corn starch processed under similar conditions formed a gel having a strength of 75-85 gm./cm$^2$. The results show that the co-processed blend provided a starch powder which formed a gel.

EXAMPLE IV

This example demonstrates that a mixture of a granular unmodified high amylose corn starch (about 70% amylose) and fructose or sorbitol can be processed using the coupled jet-cooking/spray-drying process.

The processing conditions and results were as follows:

| Conditions | Typical High Amylose Starch (Comparative) | 87.5% High Amylose Starch + 12.5% Fructose | 92.5% High Amylose Starch + 7.5% Sorbitol |
|---|---|---|---|
| Cook solids (%) | 15-16 | 14.5 | 14.0 |
| Cooking temperature (°C.(°F.)) | 143 (290) | 143 (290) | 143 (290) |
| Steam flow (g./min.) | 27.5 | 27.5 | 27.5 |
| Cooking rate (ml./min.) | 24-36 | 35.0 | 35.0 |
| Spray-dryer | Anhydro | Anhydro | Anhydro |
| Inlet temperature (°C. (°F.) | 240 (464) | 220 (428) | 230 (446) |
| Outlet temperature(°C. (°F.) | 90 (194) | 82 (180) | 84 (183) |
| Two fluid nozzle set-up | 22B | 22B | 22B |
| Cold water solubility (%) | 71.4 | 64.9 | 96.6 |
| Hot water solubility (%) | 94.5 | 83.7 | 80.3 |
| Gel strength at 6% solids (g./cm.$^2$) | 220 | 119.0 17-2.0 | |

The results show that co-processed powdered mixtures were highly soluble (64.9 and 96.6%) in cold water and formed strong gels (119 and 172 g./cm.$^2$) even though they contained lower starch solids than the comparative sample.

EXAMPLE V

This example describes the production and recovery of a derivatized starch using the coupled jet-cooking/spray-drying process.

A starch is slurried in water and the pH is adjusted to between pH 6 and pH 8 with sulfuric acid or sodium hydroxide as required. An aqueous sodium tripolyphosphate (STP) solution is added either to the bulk starch slurry or metered into the starch feed line prior to the jet-cooker at a level sufficient to give 1 to 4% STP on starch. The starch/STP slurry is jet-cooked at a temperature 163°-177° C. (325°-350° F.).

This modified starch dispersion is conveyed, at temperature and pressure substantially equivalent to those used during cooking directly to an atomization nozzle mounted in a spray-dryer. After atomization and drying the resulting powder is collected.

It is expected that the recovered starch powder will have the properties of a conventional starch phosphate produced by slurry reaction. In addition, it is expected that the powder will be readily water-soluble and not require cooking to produce a functional water dispersion. Reactions on cooked starches are known but yield liquid products and have generally been avoided due to difficulty in recovering the viscous reaction products or expense in recovering low solids cooks. For example, U.S. Pat. No. 3,637,656 (issued Jan. 25, 1972 to F. J. Germino et al.) and U.S. Pat. No. 4,579,944 (issued Apr. 1, 1986 to R. G. Harvey et al.) describe paste reaction processes for making starch derivatives.

EXAMPLE VI

This example shows that other granular high amylose corn starches can be jet-cooked and spray-dried using the coupled process. The processing conditions used for fractionated potato amylose (about 100% amylose), unmodified high amylose corn starch (about 50% amylose), and converted high amylose corn starch (about 70% amylose and having a calcium chloride viscosity of 25 seconds) are shown in Table II.

The results show that the non-granular powders are highly soluble in cold water (86.6, 95.3, and 93.0%, respectively) as well as in hot water (99.2, 96.9, and 97.1%). They form strong gels (395, 125 and 104 g/cm$^2$, respectively).

EXAMPLE VII

This example demonstrates the use of the coupled jet-cooking/spray-drying process to prepare a cold-water-soluble form of a cold-water insensitive synthetic polymer.

A medium molecular weight fully hydrolyzed polyvinyl alcohol (available from E. I. DuPont de Nemours under the trade name Elvanol 71-30) was slurried in water at 3% solids and jet-cooked at 143° C. (290° F.). Back pressure at the cooking chamber was 55 psig. The dispersed polymer was conveyed under pressure (45 psig) through an atomization nozzle (Model ¼ J82 available from Spraying Systems Inc.) top mounted in a Niro Utility #1 spray-dryer and atomized with steam at 30 psig. Heated air at 280° C. (536° F.) was used to dry the atomized solution to a free flowing powder.

The resulting product consisted of rugose spheres generally from 3 to 6 microns in diameter. A total of 31.88% of this material was soluble in water at 25° C. (77° F.) compared to 3.6% of the unprocessed polymer. The solubility test used is the one described in U.S. Pat. No. 4,072,535 (issued Feb. 7, 1987 to R. W. Short et al.). DuPont's technical service bulletin issued Dec. 1965 describes the PVA polymer as having "excellent resistance to cold water" and requiring elevation to 90°-95° C. (194°-203° F.) for complete dissolution in water. The viscosity of the spray-dried polymer at 25° C. (77° F.), dispersed in hot water at 4% solids, was 24 cps. compared to 26 cps. for the unprocessed polymer. This shows that the polymer was not substantially degraded during the processing.

EXAMPLE VIII

This example illustrates the use of the coupled jet-cooking/spray-drying process to produce a cold-water-soluble powder from a polygalactomannan gum which is normally difficult to solubilize.

Locust bean gum (available from National Starch Chemical Corp ) was slurried in water at 1% solids and jet-cooked at 132° C. (270° F.). Back pressure at the cooking chamber was 30 psig. The dispersed gum was conveyed under pressure (25 psig) through an atomization nozzle (Model ⅛ J82) top mounted in a Niro Utility #1 spray-dryer and atomized with steam at 30 psig. Heated air at 280° C. (536° F.) was used to dry the atomized mist to a free flowing powder.

The resulting product consisted of rugose spheres generally from 2 to 4 microns in diameter. A total of 71.5% of this powdered gum was soluble in water at 25° C. (77° F.) compared to 27.1% of the unprocessed gum. When redispersed in cold water at 4% solids, the viscosity was 490 cps. within 2 minutes compared to 16 cps. for the unprocessed gum. The solubility test referred to in Example VII was used.

EXAMPLE IX

This example describes the processing conditions used in the continuous coupled jet-cooking/spray-drying process when starches other than high amylose starches are pregelatinized. The equipment used is described in Example I. The processing variables and results are shown in Table III.

The results show that the non-granular corn, waxy maize, and tapioca starch powders were essentially 100% cold-water-soluble.

EXAMPLE X

This example compares the flow viscosity of jet-cooked high amylose corn starch (about 70% amylose) to water at elevated temperatures. High amylose starch slurries were cooked at solids of about 16.8-18.1%, cooking temperature of about 149° C. (300° F.), steam flow rate of 168 g./min., and cooking rate of 59.3 ml./min. The resulting flow rates through the viscometer previously described were 48, 91 and 113 ml./min. at 20, 40 and 60 psig of pressure using a 0.016 in. orifice in the atomizer nozzle. For a 0.031 in. orifice, the resulting flow rates were 313-498 and 399-642 ml./min. at 40 and 60 psig. Flow rates of water, under identical conditions were 100, 138, 190, 600 and 699 ml./min., respectively.

It can be seen that jet-cooks of high amylose corn starch flow through the spray-drying nozzles at rates no less than half that of water when the temperatures were maintained at from 126° to 153° C. (259° to 307° F.) even at 28% cook solids. This translates into a flow viscosity of less than 1 centipoise.

In contrast, when the temperature drops after a 28% solids jet-cook of high amylose corn starch exits the jet-cooker, the viscosity cannot even be measured as the starch cook forms a gel in a few seconds.

EXAMPLE XI

This example compares starches pregelatinized using the continuous coupled, jet-cooking/spray-drying process with the same starches pregelatinized using the Winkler process (U.S. Pat. No. 3,630,775).

The procedure of the Winkler patent could not be exactly duplicated. The spraying pressures disclosed in the patent range from 2000 to 6800 psig and the cooking temperatures range from 182°-304° C. (360°-580° F.). The equipment used for this experiment was limited to a pressure of 1600 psig and a temperature of 160° C. (320° F.).

A B.I.F. (a division of New York Air Brake, Providence, R.I.) model 1180 jacketed micro-feeder piston pump was modified to produce higher flow rates so that pressures up to 1600 psig could be achieved. Thermocouples were attached to the cooking chamber to monitor the temperature of the cook. The piston cavity was filled with starch slurries at 10% to 20% solids. The slurries were heated for 20 minutes to a temperature of 160° C. (320° F.) with 100 psig of steam flowing through the jacket of the pump. The starch was then pumped through a single fluid nozzle having a 0.0135 in. orifice (#80A available from Spraying Systems Inc.) at 1600 psig pressure. Samples were collected and analyzed for viscosity or gel strength.

Part A—High Amylose Starch (70% amylose)

Comparative starch samples were sprayed at 1600 psig and 160° C. (320° F.), collected, and allowed to cool and set-up for 24 hrs. at 21° C. (72° F.).

Gel strengths were run on the Texture Analyzer. Cook solids were run (using an infra-red heat lamp balance) after the gel strengths were tested.

The jet-cooking conditions used to prepare the pregelatinized starch by the coupled process were as follows: 28% cook solids (38% slurry solids), steam flow of 31 g./min., cooking temperature of 143° C. (290° F.), flow rate of 38.7 ml./min., and back pressure of 52 psig at the chamber and 48 psig at the nozzle. The spray-dryer used was an Anhydro Dryer Model No. 1 equipped with a two fluid nozzle (set-up #22B). The inlet temperature of the spray-dryer was 230° C. (446° F.) the outlet temperature was 84° C. (183° F.) and air at 20 psig was used for atomization.

Figure 3:
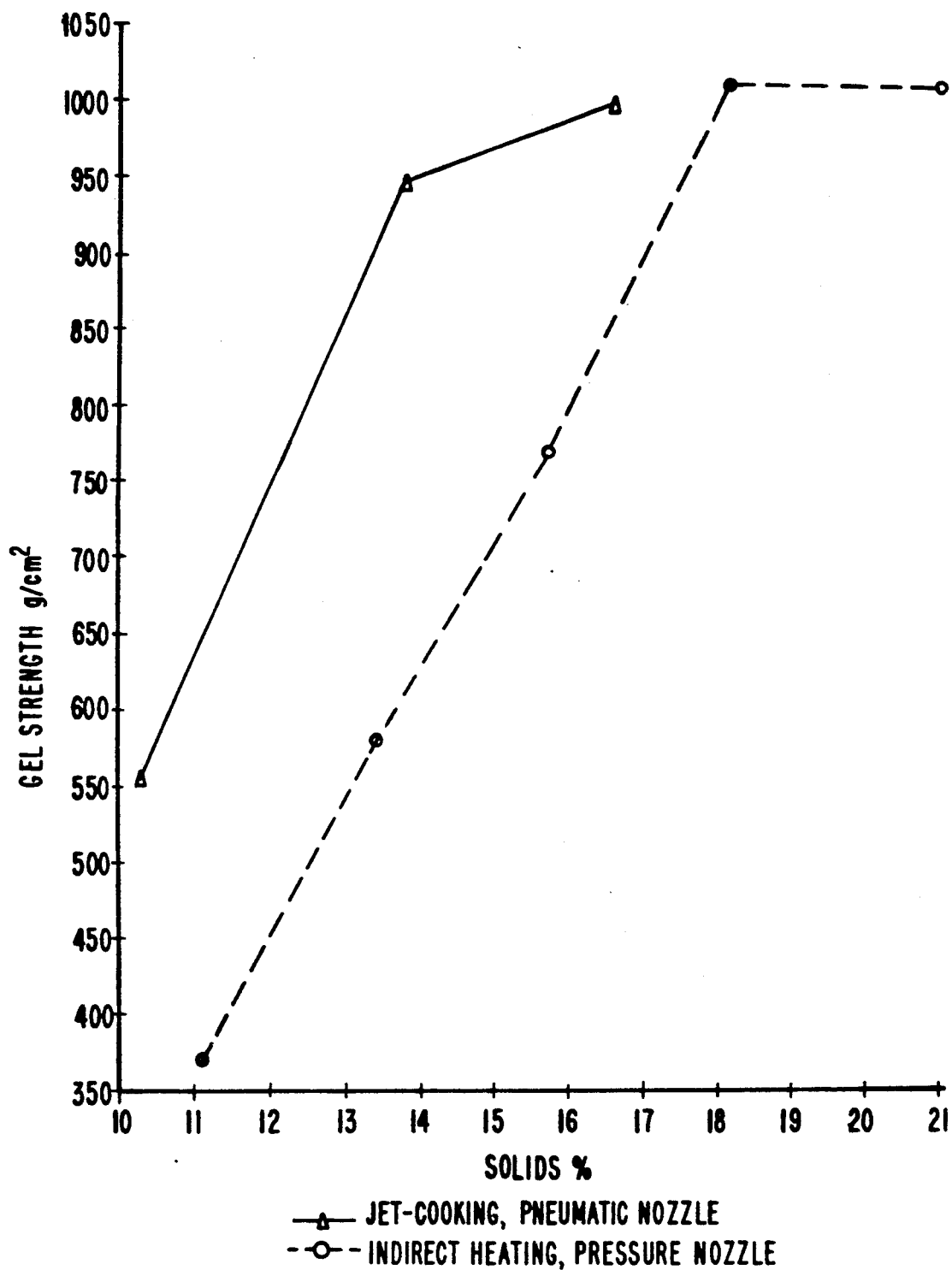
FIG. 3 compares the gel strengths of spray-dried high amylose starches (about 70% amylose) pregelatinized using the present continuous, low shear, direct heating process which couples a jet-cooker with a spray-dryer having a pneumatic-type nozzle and the cook of the continuous, high shear, indirect heating process exemplified by Winkler in U.S. Pat. No. 3,630,775 which couples a tubular heat exchanger and a spray-dryer using a single fluid high pressure nozzle.

The starches were dispersed in hot water and heated in a boiling water bath for 15 minutes, allowed to cool and set-up for 24 hours at 21° C. (72° F.). The solids and gel strengths are shown below. The starch degradation is shown in FIG. 3.

| Sample | Solids (%) | Gel Strength (g./cm.$^2$) |
|---|---|---|
| Indirect cooking/spraying | 11.1 | 370 |
| (comparative) | 13.4 | 580 |
| Continuous coupled | 10.3 | 557 |
| jet-cooking/spray-drying | 13.4 | 768 |
| process | 13.8 | 946 |
| | 16.6 | +996* |

*Gel strengths over 950 g are not accurate, as they are over the upper limits of the Texture Analyzer.

The results show that the high amylose starches prepared by indirect heating and pressure atomization gave lower gel strengths than the same starch cooked and atomized by the coupled process using direct heating. This is attributed to the less effective dispersion formed during indirect heating and the higher shear developed during atomization in the pressure nozzle. It would be expected that pressures and temperatures exceeding those used here, as taught in Winkler, will only further degrade the starch.

Part B—Other Starches

Comparative starch samples of waxy maize starch (about 0% amylose) and corn starch (about 28% amylose) were sprayed at 1600 psig at a temperature of 160° C. (320° F.) and allowed to cool to 71° C. (160° F.) before viscosity measurements were taken.

Waxy maize and corn starch samples pregelatinized using the coupled process were spray-dried at inlet temperatures of 200° C. (392° F.) and 200° C. (392° F.), and outlet temperatures of 125° C. (257° F.) and 82° C. (180° F.), using 30 psig of atomization steam and 30 psig of atomization air, respectively. The spray-dryer used for the waxy maize starch was a Niro Utility #1 dryer equipped with a two fluid nozzle (set-up 22B nozzle and 120 cap). That used for the corn starch was an Anhydro Model No. 1 dryer with the same nozzle and set-up.

The recovered starches were dispersed in hot water and heated in a boiling water bath for 30 minutes and allowed to cool to 71° C. (160° F.) before viscosity measurements were taken. Cook solids were run (using an infra-red heat lamp balance) after all samples had been tested. The solids and viscosities are shown below. The gel strengths are given in Part A.

| Sample | Solids (%) | Viscosity (cps) |
|---|---|---|
| Waxy Maize prepared by continuous coupled jet-cooking/spray-drying process | 11.9<br>15.6<br>20.0 | 423<br>740<br>1850 |
| Waxy Maize prepared by indirect cooking/spraying (comparative) | 10.0<br>14.0<br>19.4<br>21.2 | 30<br>37<br>190<br>340 |
| Corn prepared by continuous coupled jet-cooking/spray-drying process | 12.0<br>16.3<br>20.4 | 620<br>3650<br>24500 |
| Corn prepared by indirect cooking/spraying (comparative) | 12.0<br>14.0<br>19.4 | 28<br>37<br>190 |

Figure 4:
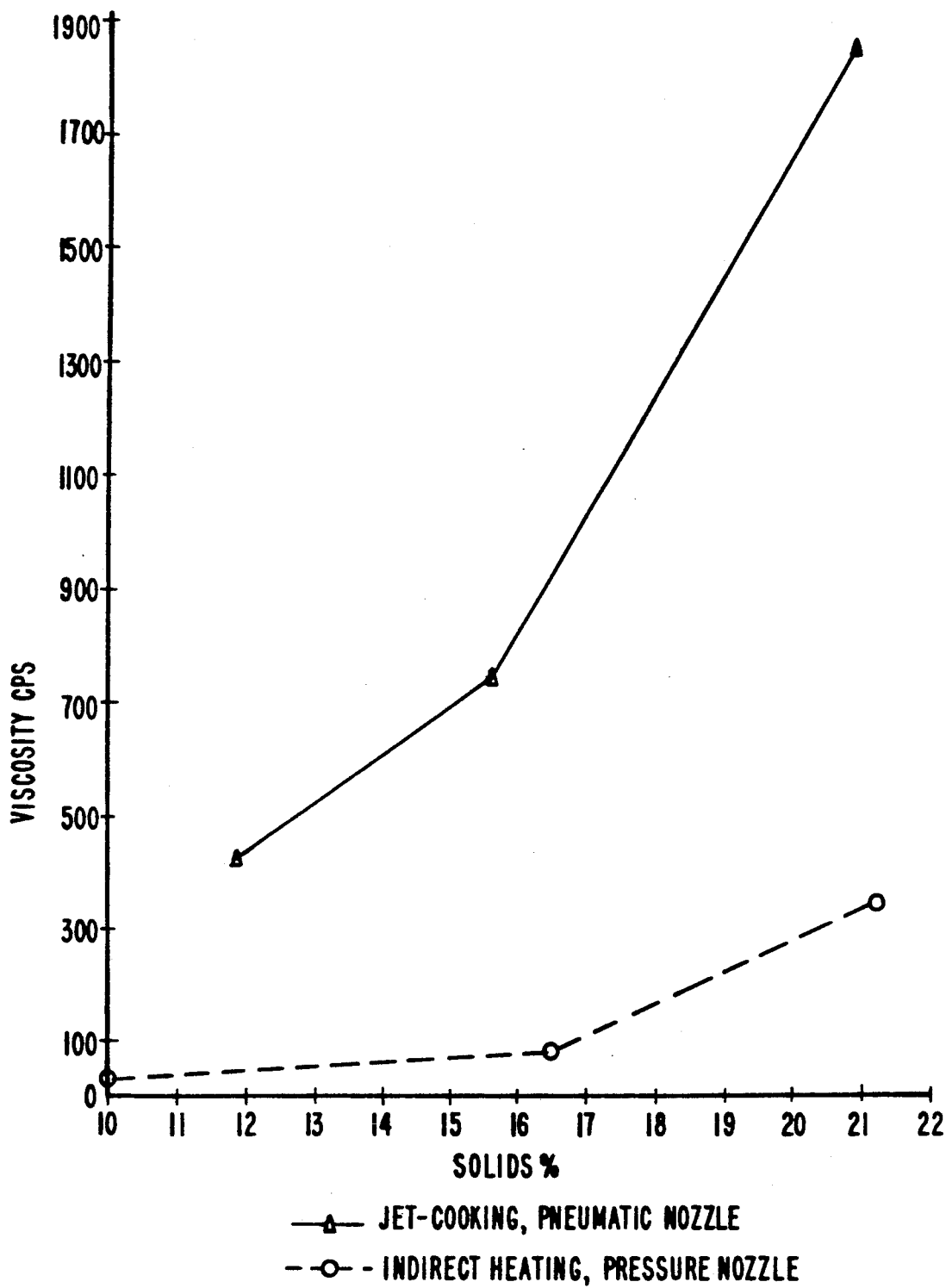
FIG. 4 compares the viscosities of waxy corn starch, pregelatinized using the present continuous, low shear, direct heating process which couples a jet-cooker with a spray-dryer having a pneumatic-type nozzle, and the cook of the continuous, high shear, indirect heating process exemplified by Winkler in U.S. Pat. No. 3,630,775 which couples a tubular heat exchanger and a spray-dryer using a single fluid pressure nozzle.
Figure 5:
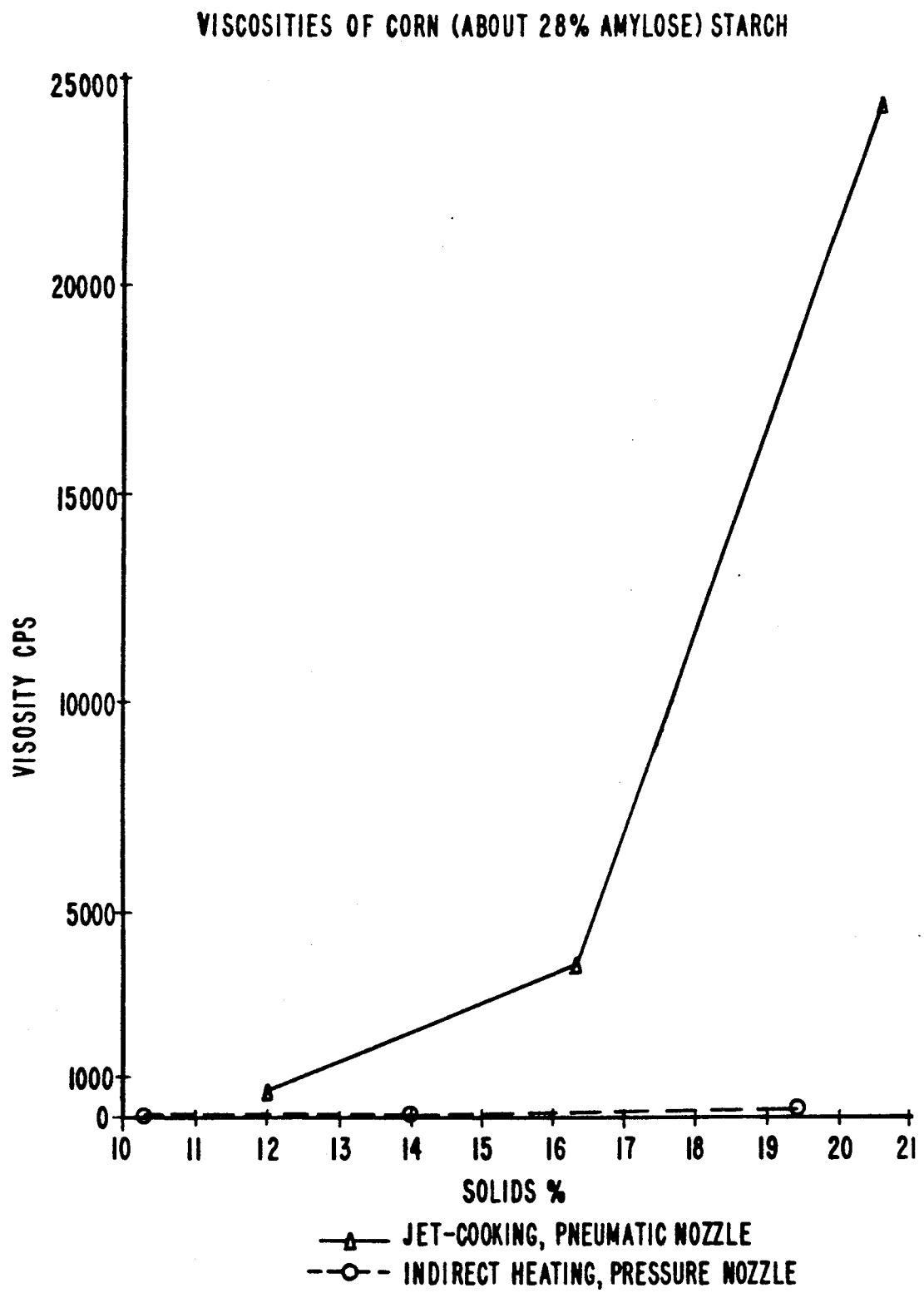
FIG. 5 compares the viscosities of corn starch pregelatinized using the present continuous, low shear, direct heating process which couples a jet-cooker with a spray-dryer having a pneumatic-type nozzle and the cook of the continuous, high shear, indirect heating process exemplified by Winkler in U.S. Pat. No. 3,630,775 which couples a tubular heat exchanger and a spray-dryer using a single fluid high pressure nozzle.

The results again show that high molecular weight starches, such as native waxy maize and corn starch, were degraded, as shown by the extreme reduction in viscosity, when processed using indirect heating and a pressure nozzle. The starch degradation is shown in FIGS. 4 and 5.

EXAMPLE XII

Figure 2A:
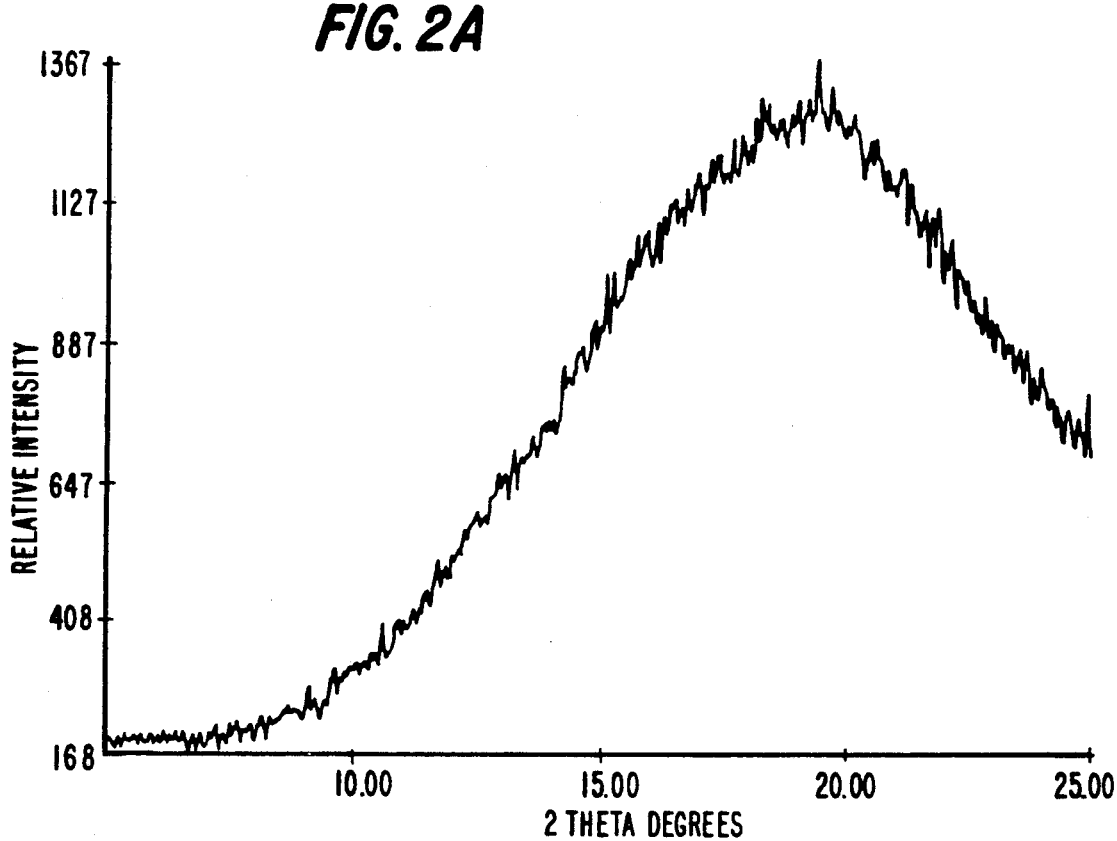
FIG. 2A shows a X-ray crystallographic scan for a high amylose starch (about 70% amylose) pregelatinized by the present continuous coupled jet-cooking/spray-drying process.
Figure 2B:
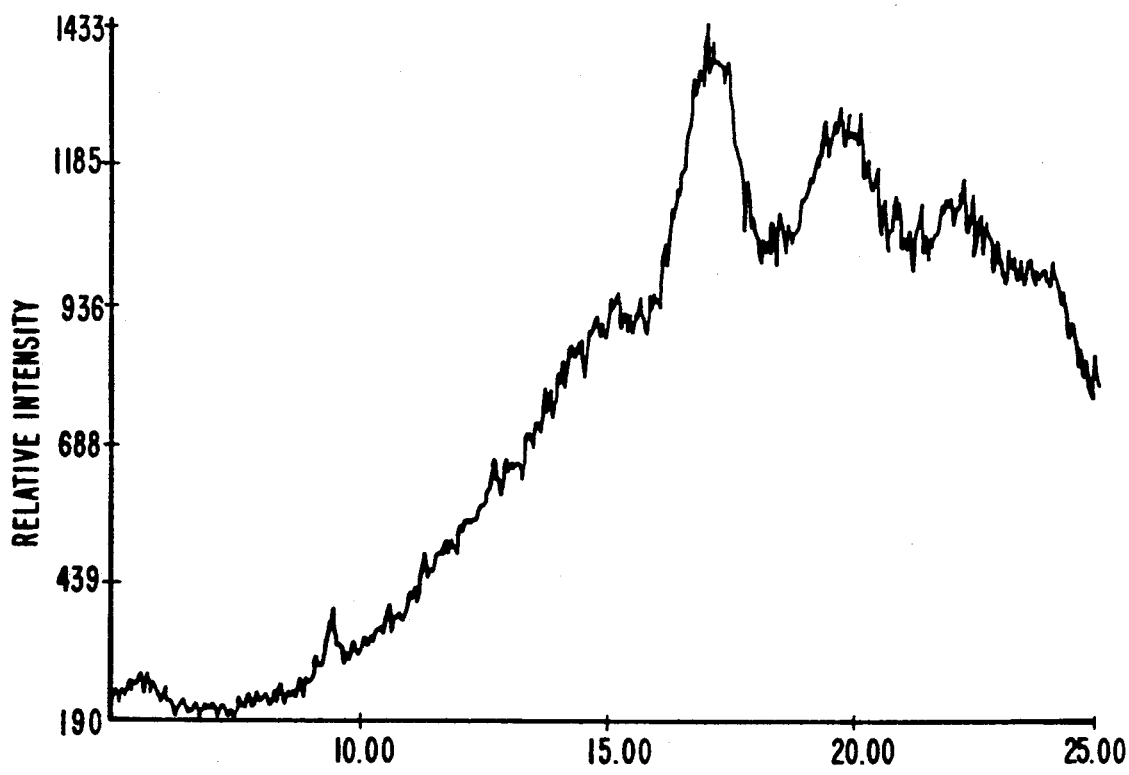
FIG. 2B shows a X-ray crystallographic scan for a high amylose starch (about 70% amylose) pregelatinized by jet-cooking and drying on a heated plate.
Figure 2C:
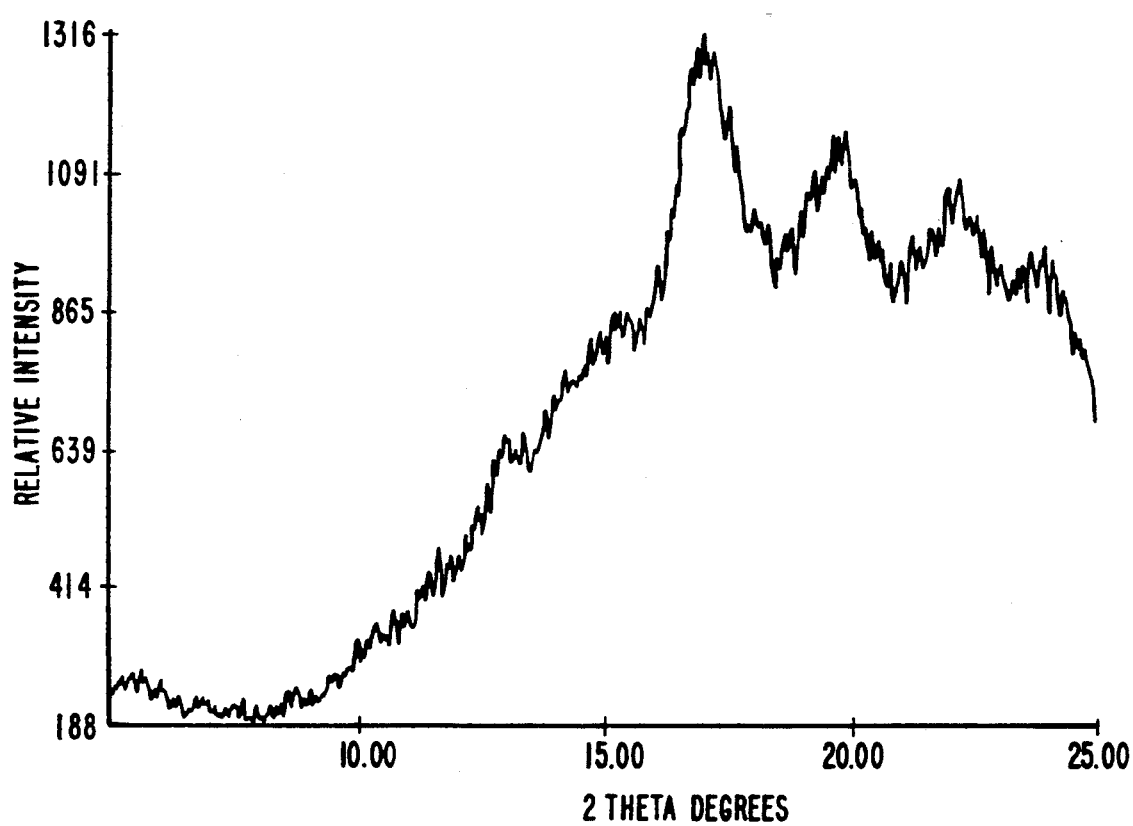
FIG. 2C shows a X-ray crystallographic scan for a high amylose starch (about 70% amylose) pregelatinized by jet-cooking and air-drying.

This example demonstrates that the pregelatinized, spray-dried, non-granular, amorphous high amylose starches prepared by the coupled process are unique. X-ray crystallographic scans (see FIG. 2) performed by Rigaku USA Danvers Mass Model No. DMAX-8 showed that the pregelatinized high amylose starch (about 70% amylose) prepared by the coupled jet-cooking/spray-drying process was amorphous, i.e., there were no crystalline peaks. Comparative pregelatinized starches (about 70% amylose) prepared by jet-cooking followed by drying on a heated plate unexpectedly contained crystalline regions. Samples made by jet-cooking followed by air-drying contained crystalline regions as expected. Native granular starch likewise contains crystalline regions.

The lack of retrogradation in the coupled jet-cooked/spray-dried material is confirmed by the higher gel strength on redispersion (160 g./cm.$^2$ at 6% solids in hot water). The same high amylose starch processed by jet-cooking and drum-drying had a gel strength of only 110g./cm.$^2$ on redispersion.

It is well known that retrograded starches do not provide as strong a gel on redispersion below 100° C. (212° F.) compared to a more soluble starch of equal amylose content. This is due to the unavailability of the retrograded amylose for gel formation.

EXAMPLE XIII

Figure 6A:
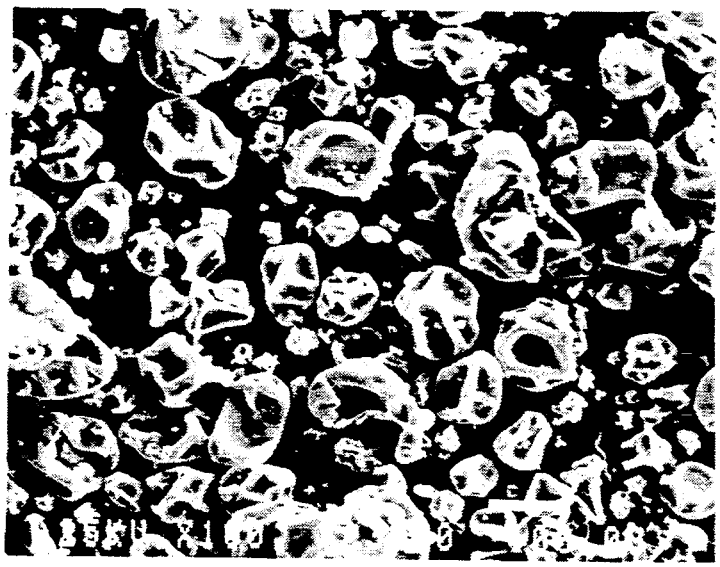
FIG. 6A presents a scanning electron microscope photomicrograph of the fully dispersed, non-granular pregelatinized high amylose starch prepared by the continuous coupled jet-cooking/spray-drying process.
Figure 6B:
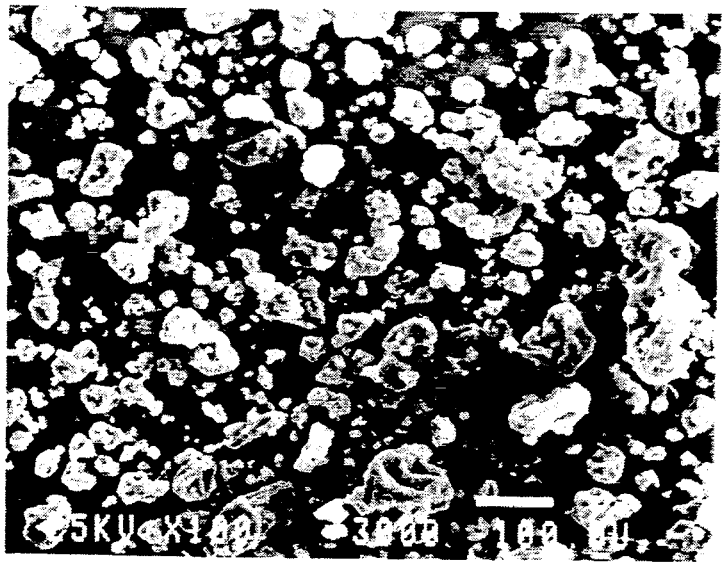
FIG. 6B presents a scanning electron microscope photomicrograph of the granular, pregelatinized high amylose starch prepared by the simultaneous atomization and cooking process of Winkler (U.S. Pat. No. 4,280,851).
Figure 6C:
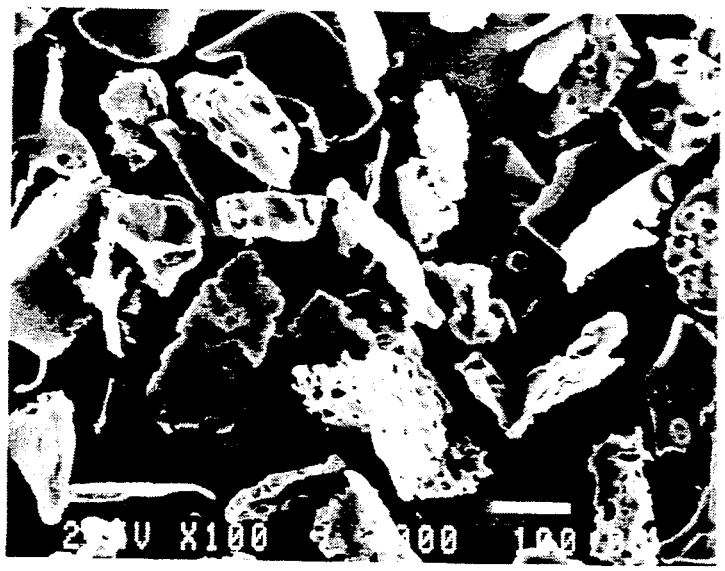
FIG. 6C presents a scanning electron microscope photomicrograph of the pregelatinized high amylose starch prepared by jet-cooking/drum-drying, a process similar to that of Sarko (U.S. Pat. No. 3,086,890).

Scanning Electron Microscope photomicrographs of pregelatinized high amylose (about 70% amylose) corn starches prepared by the present coupled jet-cooking/spray-drying process (Photograph A), the simultaneous atomization and cooking process of U.S. Pat. No. 4,280,851 (Photograph B), and the autoclaving/drum-drying process of U.S. Pat. No. 3,086,890 (Photograph C) are shown in FIG. 6. The photomicrographs of the particles that make up the powders of these starches show distinct physical differences.

The powders of the current invention are composed of non-granular, round, spray-dried particles having convoluted (dimpled) surfaces due to the rapid removal of water and subsequent collapse of the starch-film during drying. In this process, the size of the particles are determined by the size of the droplets formed during atomization and drying. These particles are unlike those prepared by the simultaneous atomization and cooking process which are generally in the form of swollen granules. This is evidenced by the slightly wrinkled surfaces characteristic of intact, swollen starch granules. Though a spray-dried particle, the starch in this photomicrograph (Photograph B) was never placed into solution and the particle size is determined largely by the degree of granular swelling during cooking. The powders of the autoclaving/drum-drying process are in the form of angular flakes. The particle size is determined by subsequent grinding and fractionation of the drum-dried sheet after drying.

The preparation of a spray-dried high amylose starch by the process of the Pitchon patent (U.S. Pat. No. 4,250,851) was difficult, and the resulting product was considerably less soluble and contained intact, non-degraded granules. As previously shown, the preparation of such a starch by the coupled process was easily carried out.

EXAMPLE XIV

This example compares the displacement density and bulk density of various pregelatinized starches prepared by the present coupled jet-cooking/spray-drying process at high solids, a conventional spray-drying process at low solids, and the jet-cooking/drum-drying process similar to that of Sarko (U.S. Pat. No. 3,086 890) at low solids. The starches prepared by the coupled process were prepared using suitable processing conditions for the particular starch source.

The results in FIG. 7 show that the relationship between displacement density and bulk density for the various methods of preparing pregelatinized starches are specific and generally lie within regions that are independent of the starch source. These density differences are due to the differences in particle shape and structure resulting from the drying step of each process.

Particles produced by the Sarko process are flakes which contain less included air than starch powders spray-dried from dispersions; thus, the density of the individual Sarko process particle (i.e., displacement density) is higher than that of spray-dried starch powders from dispersions. However, these angular flakes pack together less efficiently than spheres giving a lower bulk density.

Spray-dried starch particles dried from a dispersion generally are characterized by internal air voids and surface ridges and depressions. This structure is formed, in the spray-dryer, as the wet atomized dispersion droplet forms an air and water vapor filled bubble on heating and collapses on drying. Displacement density is strongly affected by the amount of included air which is influenced by starch type, dispersion solids, atomization variables, and spray-dryer conditions. Packed bulk density varies with particle size distribution in the powder and smoothness of the particle surface (depth of surface depressions). The coupled jet-cooking/spray-drying process yields starch powders with higher bulk densities than conventional spray-drying when using the same high viscosity base starch.

These physical differences can be used to identify the process by which the starches were prepared when supplemented with the differences in physical structure already discussed in previous Examples. The only exception in the data is the isolated potato amylose prepared by the coupled process, which lies in region I.

| Summary of FIG. 7 | | | |
|---|---|---|---|
| Process | Region | Displacement Density (g/cc) | Bulk Density (lbs/ft$^3$) |
| Conventional jet-cooking/spray-drying | I | low | low |
| Coupled jet-cooking/spray-drying | II | low | high |
| Jet-cooking/drum-drying | III | high | low-high |

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

TABLE I

| Process Conditions for Jet-Cooking/Spray-Drying High Amylose Starch (70% amylose) | | | | | |
|---|---|---|---|---|---|
| | (1) | (2) | (3) | (4) | (5) |
| Slurry Solids | 21.0 | 21.5 | 22.0 | 25.5 | 42.5 |
| Cook Solids | 13.0 | 13.0 | 13.0 | 13.0 | 28.0 |
| Jet Cooking Temperature | 143 (290) | 143 (290) | 143 (290) | 143 (290) | 143 (290) |
| Steam Flow (g./min.) | 20.0 | 24.0 | 36.0 | 62.0 | 9.25 lb./min. |
| Cook Flow (g./min.) | 30.0 | 30.0 | 30.0 | 30.0 | 3.8 gal./min. |
| Nozzle Type | | | | | 1J-152 |
| Nozzle Set-up | 22 | 22 B | 22 B | 22 B | |
| Dryer Inlet Temp °C. (°F.) | 220 (428) | 220 (428) | 220 (428) | 220 (428) | 230-191 (446-375) |
| Dryer Outlet Temp °C. (°F.) | 82 (180) | 82 (180) | 82 (180) | 82 (180) | 82-96 (180-205) |
| Atomizer Air (psig) | 20.0 | 20.0 | 20.0 | 20.0 | 120.0 (steam) |
| Gel Strength (g./cm.$^2$) | 194.0 | 215.0 | 204.0 | 134.0 | 200.1 |

TABLE II

| Process Conditions for Jet-Cooking/Spray Drying Various High Amylose Corn Starch | | | |
|---|---|---|---|
| | Fractionated Potato Amylose (about 100% amylose) | High Amylose Corn (about 50% Amylose) | Fluidity High Amylose Corn (about 70% amylose; about 25 CaCl$_2$ viscosity) |
| Slurry Solids | 20.0 | 26.7 | 30.0 |
| Cook Solids | 12.5 | 16.0 | 21.0 |
| Jet Cooking Temperature °C. (°F.) | 154 (310) | 143 (290) | 143 (290) |
| Steam Flow (g./min.) | 27.5 | 27.5 | 27.5 |
| Cook Flow (g./min.) | 19.9 | 27.0 | 39.7 |
| Nozzle Type | 2 FLUID | 2 FLUID | 2 FLUID |
| Nozzle Set-Up | 22 B | 22 | 22 |
| Dryer Inlet Temp °C. (°F.) | 225 (437) | 230 (446) | 220 (428) |
| Dryer Outlet Temp °C. (°F.) | 86 (187) | 85 (185) | 88 (190) |
| Atomizer Air (psig) | 40.0 | 20 | 20.0 |
| Cold Water Solubility (%) | 86.6 | 95.3 | 93.0 |
| Hot Water Solubility (%) | 99.2 | 96.9 | 97.1 |
| Gel Strength (g./cm.$^2$) | 395 | 125 | 104 |

TABLE III

| Process Conditions for Jet-Cooking/Spray-Drying Other Starches | | | |
|---|---|---|---|
| | Corn Starch | Waxy Maize Starch | Tapioca Starch |
| Slurry Solids | 20.0 | 20.0 | 20.0 |
| Cook Solids | 14.0 | 14.2 | 11.0 |
| Jet Cooking Temperature °C. (°F.) | 143 (289) | 143 (305) | 160 (320) |
| Steam Flow (g/min) | 35.0 | 31.0 | 47.0 |
| Cook Flow (ml/min) | 20.5-28.8 | 18.9-21.02 | 11.3-16.9 |
| Nozzle Type | 2 FLUID | 2 FLUID | 2 FLUID |
| Nozzle Set-up | 22 B | 22 B | 22 B |
| Dryer Inlet Temp °C. (°F.) | 225 (437) | 225 (437) | 218 (424) |
| Dryer Outlet Temp °C. (°F.) | 86 (187) | 97 (207) | 95.0 (203) |
| Atomizing Air PSI | 20-25 | 25.0 | 15.0 |
| Moisture (%) | 5.0 | 5.6 | 5.0 |
| 1% Solids pH | 6.5 | 6.8 | 6.9 |

TABLE III-continued

| Process Conditions for Jet-Cooking/Spray-Drying Other Starches | | | |
|---|---|---|---|
|  | Corn Starch | Waxy Maize Starch | Tapioca Starch |
| Cold Water Solubility (%) | 98.6 | 97.7 | 100.0 |

What is claimed is:

1. A continuous coupled process for jet-cooking and spray-drying an inherently water-dispersible or water-soluble cryatalline polymer, which comprises the steps of:
   (a) forming a polymer slurry or a polymer paste comprising the polymer and water;
   (b) jet-cooking the polymer slurry or the polymer paste in a jet cooker with steam at about 93°–177° C., the temperature being sufficient to form a polymer solution or a polymer dispersion;
   (c) conveying and introducing at a temperature of about 93°–177° C. and a pressure of about 20–150 psig the jet-cooked dispersion or solution into a nozzle of a spray-dryer chamber;
   (d) atomizing the jet-cooked polymer dispersion or the jet-cooked polymer solution through the nozzle of the spray-dryer chamber;
   (e) drying the atomized mist within the spray-dryer chamber at a temperature sufficient to dry the dispersed or the solubilized polymer; and
   (f) recovering the dried polymer as a water-dispersible or a water soluble powder.

2. The process of claim 1 wherein the conveying and introducing to the nozzle is carried out at substantially the same temperature and pressure as is the jet-cooking.

3. The process of claim 1 wherein the atomizing is carried out with air and/or steam using a pneumatic nozzle.

4. The process of claim 3, wherein the jet-cooked dispersion or solution is conveyed and introduced into the nozzle of the spray-dryer chamber at a pressure of 20–150 psig and wherein the air or steam used in atomizing the jet-cooked dispersion or solution is at a pressure of 20–175 psig.

5. The process of claim 1, wherein the polymer is a high amylose starch having an amylose content of above about 40%.

6. The process of claim 5, wherein the starch has an amylose content of about 50–70%.

7. The process of claim 1, wherein the starch has an amylose content of 40% or less or substantially no amylose.

8. The process of claim 7, wherein the starch is a corn, tapioca, potato, rice, or waxy maize starch.

9. The process of claim 1, wherein the polymer is a mixture of a high amylose starch having an amylose content of about 50% or above and a starch having an amylose content of 40% or less provided that the total amylose content of the mixture is about 35% or above.

10. The process of claim 9, wherein the high amylose starch has an amylose content of about 50% and the starch having the amylose content of about 40% or less is a converted corn starch.

11. The process of claim 1, wherein the polymer is a mixture of a starch and a polygalactomannan gum.

12. The process of claim 1, wherein the polymer is a mixture of a starch and a fully hydrolyzed polyvinyl alcohol.

13. The process of claim 1, wherein the slurry of step (a) further comprises a water-soluble, water-dispersible, or water-insoluble compound other than the crystalline polymer.

14. The process of claim 13, wherein the crystalline polymer is a starch and the other compound is a water-insoluble compound capable of being encapsulated by the cooked polymer during steps (d) to (f).

15. The process of claim 14, wherein the water-insoluble compound is an oil.

16. The process of claim 13, wherein the crystalline polymer is a starch and the water-soluble or water-dispersible compound is capable of complexing with the starch.

17. The process of claim 16, wherein the water-soluble or water-dispersible compound capable of complexing is a fatty acid.

18. The process of claim 13, wherein the crystalline polymer is a starch and the water-soluble compound is a sugar.

19. The process of claim 1, wherein the polymer is a cold-water-insoluble, a partially insoluble, or a slow to hydrate crystalline polymer which is inherently water-dispersible or water-soluble.

20. The process of claim 19, wherein the polymer is a natural polymer.

21. The process of claim 20, wherein the natural polymer is a polysaccharide.

22. The process of claim 21, wherein the polysaccharide is a starch or a mixture of starches.

23. The process of claim 19, wherein the polymer is a synthetic polymer.

24. The process of claim 23, wherein the synthetic polymer is a fully hydrolyzed, medium to very high molecular weight polyvinyl alcohol.

25. The process of claim 20, wherein the natural polymer is a gum.

26. The process of claim 25, wherein the gum is a polygalactomannan.

27. The process of claim 25, wherein the natural polymer is a cellulose derivative.

28. The process of claim 1, wherein the polymer is a high amylose starch having an amylose content of about 50–70% and wherein the jet-cooking is carried out at about 138°–177° C.

29. The process of claim 1, wherein the polymer is a starch having an amylose content of less than about 40% and wherein the jet-cooking is carried out at about 121°–162° C.

30. The process of claim 1, wherein the polymer is a low viscosity cold-water-soluble starch and wherein the jet-cooking is carried out at about 104°–148° C.

31. The process of claim 1, wherein the polymer is a fully hydrolyzed polyvinyl alcohol and wherein the jet-cooking is carried out at about 99°–163° C.

32. The process of claim 1, wherein the polymer is a polygalactomannan gum and wherein the jet-cooking is carried out at about 93°–163° C.

* * * * *